US007363654B1

(12) United States Patent
Yamada

(10) Patent No.: US 7,363,654 B1
(45) Date of Patent: Apr. 22, 2008

(54) DATA TRANSMISSION SYSTEM AND SALE MANAGING SYSTEM

(75) Inventor: Tokuhiro Yamada, Tokyo (JP)

(73) Assignee: Kabushiki Kaisha Visual Japan, Tokyo (JP)

( * ) Notice: Subject to any disclaimer, the term of this patent is extended or adjusted under 35 U.S.C. 154(b) by 1070 days.

(21) Appl. No.: 10/110,584

(22) PCT Filed: Oct. 12, 2000

(86) PCT No.: PCT/JP00/07064

§ 371 (c)(1),
(2), (4) Date: Apr. 11, 2002

(87) PCT Pub. No.: WO01/27778

PCT Pub. Date: Apr. 19, 2001

(30) Foreign Application Priority Data

Oct. 13, 1999 (JP) .................................. 11-291162
Oct. 6, 2000 (JP) .............................. 2000-308237

(51) Int. Cl.
H04L 29/00 (2006.01)

(52) U.S. Cl. ....................................................... 726/15
(58) Field of Classification Search ................ 726/6–7, 726/5, 34, 33, 15
See application file for complete search history.

(56) References Cited

U.S. PATENT DOCUMENTS 5,790,677 A * 8/1998 Fox et al. ....................... 705/78
5,832,484 A * 11/1998 Sankaran et al. ............... 707/8
5,899,990 A 5/1999 Maritzen et al.
5,903,721 A * 5/1999 Sixtus ............................ 726/2

6,697,944 B1 * 2/2004 Jones et al. .................. 713/168

FOREIGN PATENT DOCUMENTS

EP 449449 A 10/1991
EP 492692 A 7/1992

(Continued)

OTHER PUBLICATIONS

XP000655454—Wong, J, et al: "Remote Database Access In The Distributed Computing Environment", Software Practice & Experience, John Wiley & Sons, Ltd. Chichester, GB, vol. 24, No. 4, Apr. 1, 1994.

(Continued)

Primary Examiner—Matthew B Smithers
(74) Attorney, Agent, or Firm—Butzel Long

(57) ABSTRACT

In a network-type data transmission system wherein a server 4(5) and a plurality of terminal units (client computers) 1(2,3) sharing the server 4(5) are connected by way of a network circuit 6, a packet generating means 223 of each terminal unit generates a packet command complying with a DB command transmission protocol independent of the network circuit each time the terminal unit collects data, and a packet converting means 423 of the server having received the packet command converts the packet command into a DB operation command, executes the DB operation command, and reflects an executed result on the DB, so that a demand from the terminal unit is responded in real time.

With the above structure, an operation of a database server from the terminal unit is realized only by implementing a communication driver which realizes the TCP-IP, and an effective sales management system such as the POS system can be constructed.

20 Claims, 13 Drawing Sheets

FOREIGN PATENT DOCUMENTS

| | | |
|---|---|---|
| EP | 807911 A | 11/1997 |
| JP | 6-131399 A | 5/1994 |
| JP | 6-139213 A | 5/1994 |
| JP | 6-205021 A | 7/1994 |
| JP | 10-11464 A | 1/1998 |
| JP | 10-188140 A | 7/1998 |
| JP | 10-214383 A | 8/1998 |
| JP | 10-312413 A | 11/1998 |
| JP | 11-66433 A | 3/1999 |
| JP | 11-96187 A | 4/1999 |
| JP | 11-175543 A | 7/1999 |
| JP | 11-203365 A | 7/1999 |
| JP | 2002-370311 | 12/2002 |
| JP | 2003-112399 | 4/2003 |
| WO | WO 99 06925 | 2/1999 |
| WO | WO 99 46708 | 9/1999 |
| WO | WO 99 50733 | 10/1999 |

OTHER PUBLICATIONS

XP002224695—Vogels, W: "World Wide Failures", Internet, [Online], Sep. 11, 1996.

XP002911092—"3. DCE Technology Components", Internet, 1996.

XP002224696—Coulouris G, et al: "Archive Material from Edition 2 of Distributed Systems: Concepts and Design", Internet, [Online] 1994.

XP000704460—Eberhardt R, et al: Electronic Commerce—A Comparative Study of Web Based Database Access, Issue '97, World Telecommunication Congress. (International Switching Symposium), Global Network Evolution.

"posmain2" [online], 1998, Kabushiki Kaisha IVP [retrieval date Jan. 31, 2001], Internet <URL:http://222.ivp.co.jp/pomain2.html>, 1 pg. not in english.

"Home Page", [online], 1998, Kabushiki Kaisha IVP [retrieval date Jan. 31, 2001], Internet <URL:http://222.ivp.co.jp/secure.html>, 2 p. not in english.

"posmain" [online], 1998, Kabushiki Kaisha IVP [retrieval date Jan. 31, 2001], Internet <URL:http://222.ivp.co.jp/pomain2.html> (cited in order to establish the issued date of "posmain2", "Home Page" above mentioned), 3 ps. not in english.

Masaya Norifusa, "Anzenna Internet no tameno Security Protocol Katsuyouhou; Dai 4 kai Riyou Jirei ni Manabu", Nikkei Communication, No. 266, Kabushiki Kaisha Nikkei BP (Mar. 16, 1998), pp. 154-159, not in english.

Camillo Sars et al., "Angouka Gijutsu ga hiraku Internet Shin Jidai; Dai 3 kai Transport sou Protocol SSH ga Kanou ni suru Anzenna Enkaku Log-in", Dr. Dobb's Journal Japan, vol. 7, No. 2, (Feb. 1995), pp. 63-69, not in english.

"News Release", [online], Oct. 1997, Kabushiki Kaishi Seven-Eleven Japan, [retrieval date: Jan 31. 2001], Internet <URL:http://sej.gse.ne.jp/06/0601/0601link/001.html>, 4 pgs. not in english.

"BODY", [online], Mar. 2000, Kabushiki Kaisha Web Base [retrieval date: Jan. 31, 2001], Internet <URL:http://www.web-base.co.jp/body.html>, 1pg. not in english.

"What is WEBPOS?", [online], Mar. 2000, Kabushiki Kaisha Web Base, [retrieval date: Jan. 31, 2001], Internet <URL:http://www.web-base.co.jp/products/pro01.html>, 1pg. not in english.

"System Integration", [online], Mar. 2000, Kabushiki Kaisha Web Base, [retrieval date: Jan. 31, 2001], Internet <URL:http://web-base.col.jp/bisiness/sys.html>, 1 pg. not in english "Retail Tech Japan 2000", [online], Nippon Keisai Shinbunsha, [retrieval date: Jan. 31, 2001], Internet <URL:http://www.kyodoplaza.gr.jp/nikkei/events2000/RT/index.html>, Internet <URL:http://www.kyodoplaza.gr.jp/nikkei/events2000/RT/exhi_cont.html#Visual Japan> (cited in order to establish the issued date of BODY, "What is WEBPOS?" and "System Integration", above mentioned, and to show the fact of exhibiton of the product "WebPOS"), not in english Japanese only.

Coulouris, et al, "Archive Material from Edition 2 of Distributed Systems: Concepts and Design" Internet Online! (URL:http://citeseer.nj.nec.com/cs) page 2 1994.

"3. DCE Technology Components" Internet 1996 paragraph '3.2.5!—paragraph '3.2.7! paragraph '03.5!.

Freier et al., The SSI Protocol Version 3.0 (Draft-ietf-tls-ssl-verson3-00.txt)IETF Standars-Working-Draft, Internet Engineering Task Force, IETF, CH, Nov. 18, 1996 XP015029170, ISSN 0000-0004, pp. 1-65.

McAvoy, "Open Datebase Connectivity (ODBC) and the Human Machine Interface (HMI) Database" ISA TECH/EXPO Technology Update, Instrument Society of America, Res. Triangle, NC US, vol. 1, NR part 1, 1997 XP000832892, ISSN 1054-0032, pp. 163-172.

* cited by examiner

CLIENT COMPUTER 2

SEVER COMPUTER 4

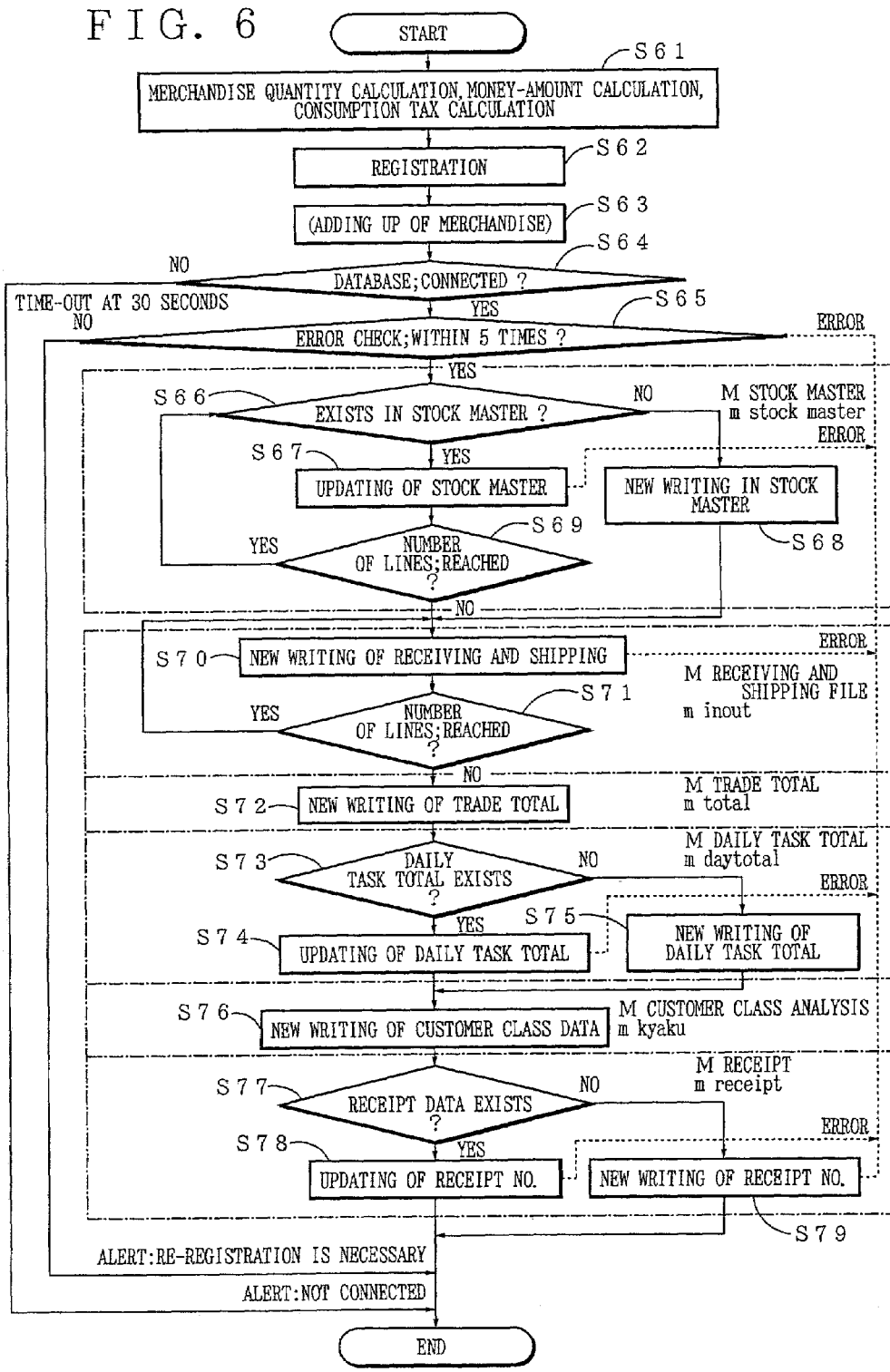

FIG. 7

| | COMMAND NAME (PARAMETER) | COMMAND FORMAT | FUNCTION |
|---|---|---|---|
| (1) | Register (OBJECT NAME, SERIAL) | Register (Pobj, "VVV000-00000-00000-00000") | REGISTRATION OF SERIAL NUMBER |
| (2) | Setserverip (OBJECT NAME, IP OR DOMAIN NAME FLAG, IP ADDRESS & DOMAIN NAME) | Setserverip(Prbj, 0, "000.000.00.000", 1=DOMAIN NAME | SETTING OF IP ADDRESS AND DOMAIN NAME |
| (3) | Setid (OBJECT NAME, STORE CODE, STORE KEY) | Setid (Pobj, 0000001, "AAAAAAAA") | SETTING OF ID |
| (4) | Setoption (OBJECT NAME, ACCESS & ERROR BY WAY OF TCP-IP FLAG) | Setid (Pobj, 00) | INDICATION OR NON-INDICATION OF A DIALOG OF AN ACCESS ERROR BY WAY OF TCP-IP |
| (5) | OpenDatabase (OBJECT NAME, STORE CODE, STORE PASSWORD, POSNO) | OpenDatabase (Pobj, "0000001," "0001," "01,") | OPENING OF DATABASE |
| (6) | CloseDatabase (OBJECT NAME) | CloseDatabase (Pobj) | CLOSING OF DATABASE |
| (7) | ExecuteSQL (OBJECT NAME, SQL STATEMENT) | ExecuteSQL (Pobj) | TRANSMITTING OF SQL STATEMENT |
| (8) | Fetchnextrecord (OBJECT NAME) | Fetchnextrecord (Pobj) | SELECTION OF LINE OF DATA HAVING READ IN |
| (9) | GetcurRecord (OBJECT NAME) | GetcurRecord (Pobj) | READING OF DATA |
| (10) | CommitTransaction (OBJECT NAME) | CommitTransaction (Pobj) | UPDATING OF DATA |
| (11) | RollbackTransaction (OBJECT NAME) | RollbackTransaction (Pobj) | DELETION OF DATA |
| (12) | Getlasterror (OBJECT NAME) | Getlasterror (Pobj) | ERROR CONTENTS |

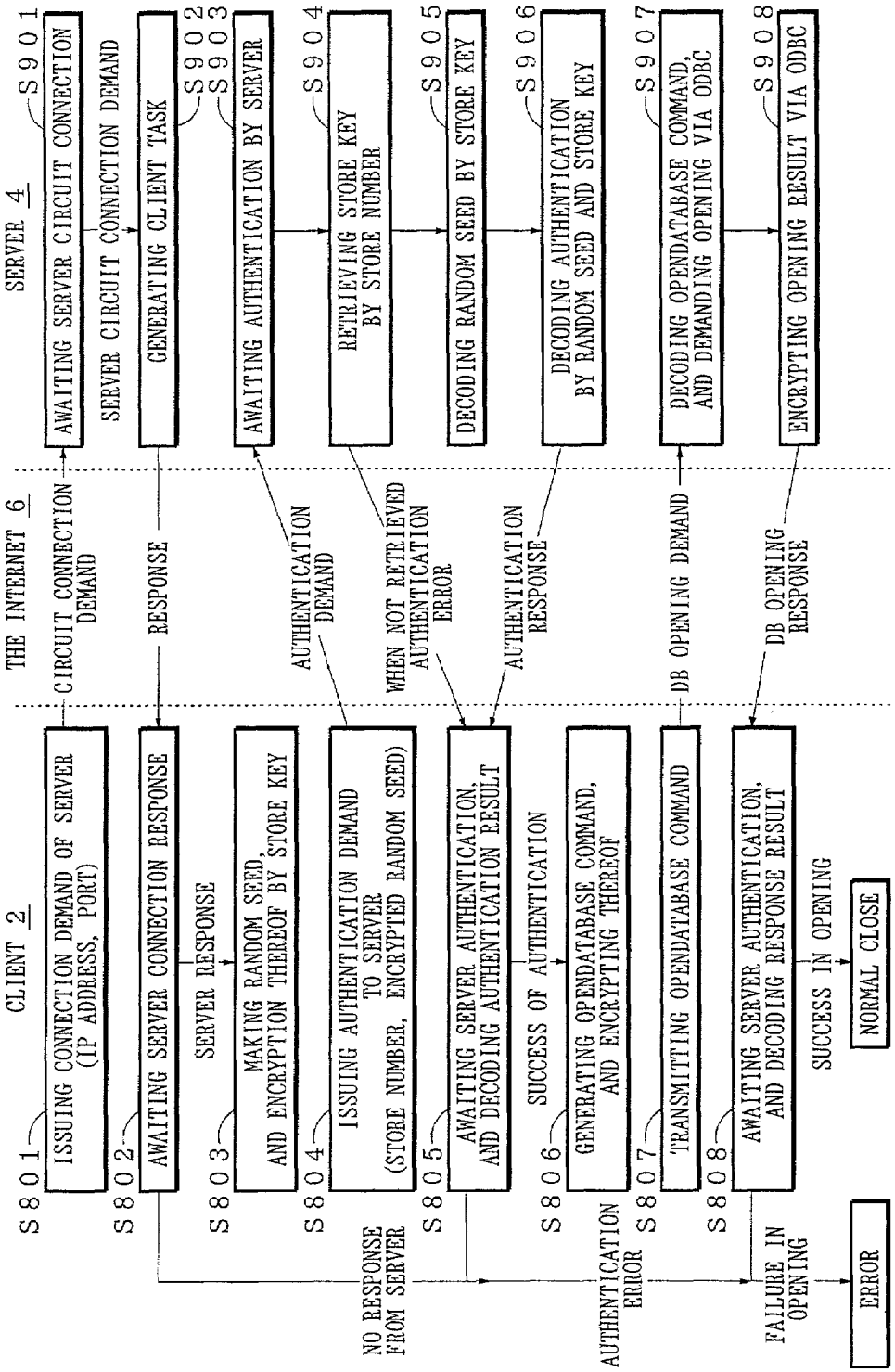

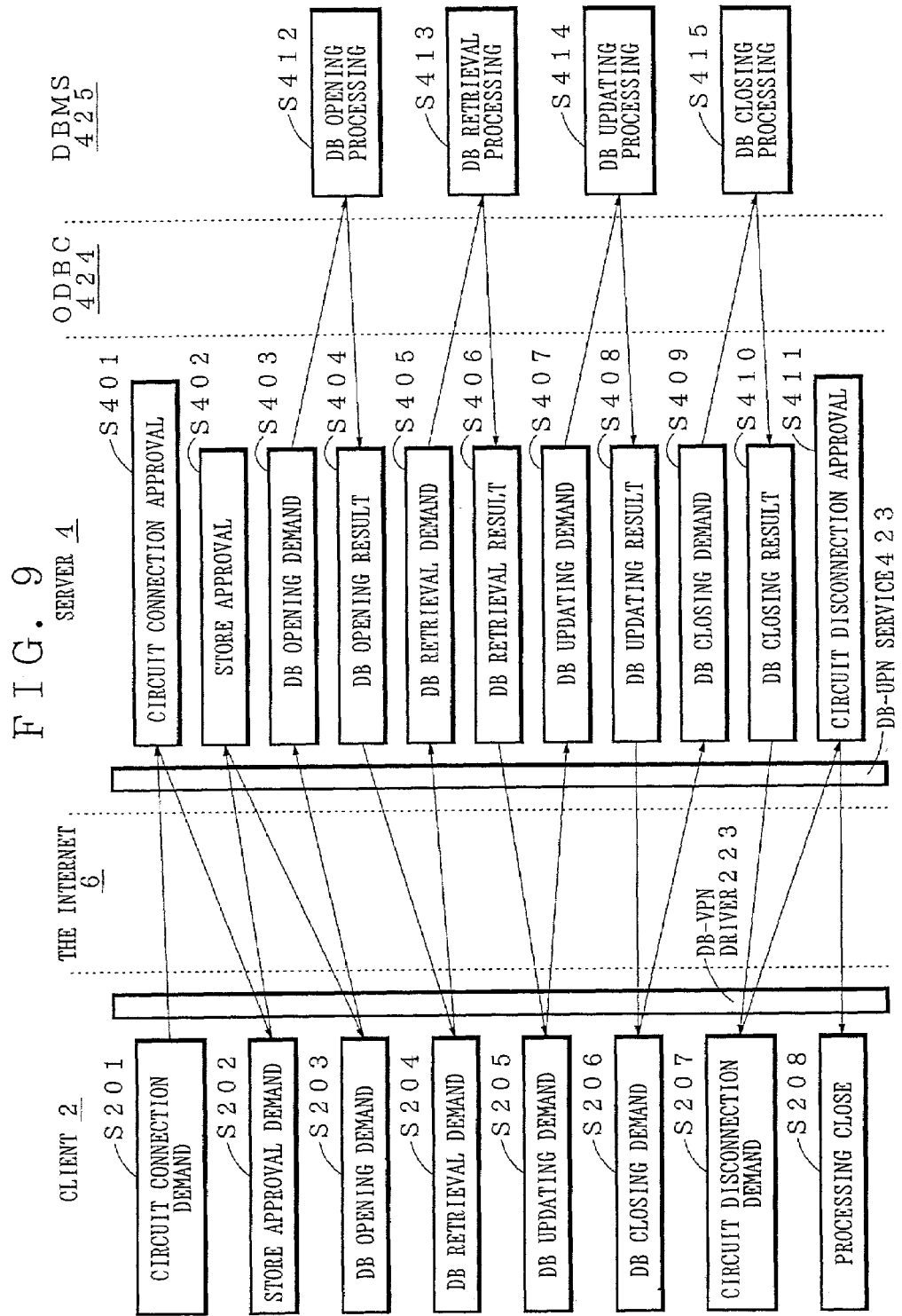

DATA TRANSMISSION SYSTEM AND SALE MANAGING SYSTEM

TECHNICAL FIELD

The present invention relates to a network-type data transmission method and system, a server or a terminal unit in the system, a recording medium having recorded the method being programed, and a sales management system using the method, which are especially suitable for a POS (Point Of Sales) system.

BACKGROUND ART

A POS terminal is used in the retail trade field, i.e. at convenience stores or supermarkets, for sales management. On the POS terminal, the price is added up by reading the bar code printed on a package or on a price tag attached to the merchandise at the point of sales by means of a scanner or by operating a keyboard.

At a relatively large retail chain store, the POS terminals are connected to the store's server (hereinafter, store server), which carries out amount management, sales management, stock inquiry or appropriation, through the store's communications circuit such as LAN (Local Area Network) such that data is registered or stored in a database of the server. Further, the store server is connected to another server (e.g. headquarters' server) by way of a private circuit or a public circuit such as ISDN so that sales management data can be periodically collected.

As to the above POS terminal, an all-in-type of a register type is the mainstream. And, as to the communications circuit, the modem communication using the general subscribed telephone circuit or the ISDN circuit is conventionally the mainstream. And, the frame relay circuit is used in an environment thinking much of security and/or having a margin of funds. In any case, because communications using the above is usually carried out once in the night or several times a day, the communication cost is low. And, because the connection with the host server is carried out basically one-on-one by dialing-up, a communications means with high security is provided.

As above, because the Client Server System, wherein a plurality of store servers communicate with the host server, has become the mainstream, equipment capable of communicating independently of register operation or system capacity is increasing. Since all the master are held in the store server (the client), if power source is secured, the POS system can solely work regardless of the communications circuit condition. Especially, a master is necessary at a situation that a lot of items exist and therefore the merchandise shall be managed item by item, wherein dependence on the store server increases.

FIG. 15 is a block diagram showing an outline of the configuration of a POS system using the above conventional client server system. In the figure, 51 denotes the client computer installed at each store, and 52 is the server computer installed in the headquarters. The server computer self-contains a database (DB) 521. Both the servers are connected in a closed network, i.e. a private circuit or public network 57, through a LAN (Local Area Network) or WAN (Wide Area Network) circuit 53,54 and further a router or terminal adapter 55,56.

The client computer 51 has, besides a POS application program 511, a common interface dependent on an operating system (OS) in use and independent of a database management system (DBMS) and has a ODBC (Open Database Connectivity) driver 512 to invoke the DBMS so as to execute the operation of the DB 521 self-containing the server 52. The server 52 has, besides the DB 521, for example a SQL server 522 as the DBMS and the above ODBC driver 523 and answers the DB operation give out from the client computer 51, for example, for an updating demand and a daily task sales totalization of the merchandise master according to a connection protocol between the ODBC drivers 512,523.

As above, the store terminal device of the general POS system is mainly an all-in-type of a register type, and therefore the customizing according to uses and space is difficult. And, if customized, enormous cost and the maintenance are required.

On the other hand, as the communications circuit the modem communication using the ISDN circuit or the general subscribed telephones circuit is conventionally the mainstream. And, the frame relay circuit is used in an environment thinking much of security and/or having a margin of funds. However, if the communication connection by dialing up is applied and carried out whole day, the communication cost increases. Accordingly, the entire data processing between the host servers is usually carried out by several times of connections per day, which means that only the totalized data of one day or several hours can be transmitted to the host server. And, the headquarters has to bear considerably enormous equipment investment for enabling the host server to one-on-one receive/deliver data from/to a lot of store servers simultaneously.

Further, the headquarters or each store has to bear maintenance cost and enormous communication cost. And, today the Client Server System, wherein another server is provided on the store so as to executing communication with the host server regardless of the number of the store POS terminals, has become the mainstream. In this system the server on the headquarters receives the totalized data from each store (the client). Therefore, because the timing to deliver a new merchandise master and other information is limited, usually data of one-day delay is received and the master for the next day is delivered. Therefore, unfortunately store information such as a sales situation of, for example, new merchandise cannot be obtained in real time.

Recently, another terminal unit is installed at the store in order to solve the above, which further increases the investment for equipment at the store. And since the master as the core is held in the store server, when a failure arises on this, considerable trouble and cost are required for restoration.

Further, in the Client Server System shown in FIG. 15, the ODBC driver 512 shall be provided on the client computer 51 similarly to the server 52 in order to operate the DB 521 in the server 52. And, the DB operation from the client computer 51 can not be done without the connection protocol between both the ODBC drivers.

DISCLOSURE OF THE INVENTION

In view of the foregoing, a first object of the present invention is to provide a network-type data transmission method and a system, a server or a terminal unit in the system, a recording medium having recorded the method being programed, wherein a database (DB) server can be operated from a client computer only by implementing the TCP-IP (Transport Control Protocol-Internet Protocol) communication driver normally used in the computer communication connection and therefore an ODBC driver is not required on the client computer.

And a second object of the present invention is to provide a network-type data transmission method and a system, a server or a terminal unit in the system, a recording medium having recorded the method being programed, wherein, in a Client Server System connecting a host server self-containing a database (DB) and clients sharing the host server by way of a network circuit, a packet command complying with a new command transmission protocol independent of the network circuit is generated at the client each time the client collects data, the packet command is converted into a desirable DB operation command and executed at the host server having received the packet command, an execution result of the DB operation command is reflected to the DB of the host server, and a demand from the client is responded in real time.

Further, a third object of the present invention is to provide a sales management system using the network-type data transmission method, wherein a general-purpose personal computer is used as a POS terminal, all sales data such as a master is gathered on a host server, the personal computer is connected to the host server by way of the Internet, and the POS data is transmitted/received in real time by always referring to a new master, whereby the current sales amount, inventory, sales situation can be checked from all the terminal units only by the connection with the Internet thereby with high degree of freedom and low communication cost, and wherein information transmission is executed with low cost by using the Internet broadcasting for an information notification, the Internet market research linked to the Internet broadcasting is carried out for timely collecting and analyzing the user needs, and an interactive banner is produced in a virtual world by using an effective sales promotion CD-ROM made on the result of the above analysis, whereby an effective and intelligible merchandise introduction can be done with minimum cost.

In order to achieve the above objects, as for the inventive network-type data transmission method, for example as shown in FIG. 1, in a client server system wherein a DB server 4(5) and a plurality of client computers 1,2,3 sharing the DB server 4(5) are connected by way of a network circuit 6, the client computer generates a packet command complying with a DB command transmission protocol independent of the network circuit each time the client computer collects data, and the DB server 4(5) having received the packet command converts the packet command into a DB operation command, executes the DB operation command, and reflects an executed result on the DB, so that a demand from the terminal unit is responded in real time.

The DB command transmission protocol independent of the network circuit generates, and interprets, the packet command prepared along with a parameter necessary for each of processings for DB opening, DB retrieval, DB updating, and DB closing so as to make the DB server 4(5) start, and execute, the processings each time the client computer 1(2,3) collects data. When the packet complying with the DB command transmission protocol independent of the network circuit is generated by the client computer 1(2,3), an encryption processing is carried out on the packet, the packet is transmitted to the DB server 4(5), and the packet is decoded at the DB server 4(5). When the DB server 4(5) responds to the client computer 1(2,3), an encryption processing is carried put on the packet, the packet is transmitted to the client computer 1(2,3), and the packet is decoded at the client computer 1(2,3). A compression/expansion processing can be carried out on the packet.

With the above, the DB of the server 4(5) can be operated independently of the circuit to be used, and the DB engine (the ODBC driver 512) is not necessary for the client 1,2,3. And, when the present method is applied to the POS system, sales information and the like of all the stores are gathered on the DB server 4(5) installed at the headquarters, and the store terminal units (the client computer) 1,2,3 are connected with the host server 4(5) by way of the Internet 6, the POS data can be transmit-received in real time by always referring to the new master. Therefore, an environment capable of checking the current situation from every terminal units 1,2,3 in real time can be provided by the connection with the Internet 6 any time and anywhere.

As shown in FIG. 1 for example, in the network-type data transmission system wherein a DB server 4(5) and a plurality of terminal units (client computers) 1,2,3 sharing the DB server 4(5) are connected by way of a network circuit 6, each time each client computer 1(2,3) collects data the client computer 1(2,3) generates a packet command complying with a DB command transmission protocol independent of the network circuit, and the server 4(5) having received the packet command converts the packet command into a DB operation command, executes the DB operation command, and reflect an executed result on the DB, so that a demand from the client computer 1(2,3) can be responded in real time. The Internet 6 shown in FIG. 1 is used as the network circuit 6.

As shown in FIG. 4, the client computer 2 has a packet generating means (DB-VPN driver) 223 to generate the packet command complying with the DB command transmission protocol independent of the network circuit in use each time the client computer executes retrieval, addition, or deletion of data and a communication interface means (TCP-IP communication driver) 222 to execute communication complying with a protocol necessary for exchanging the packet with the server. And, as shown in FIG. 10, the packet generating means (DB-VPN driver) 223 includes, besides a command-generating body portion 2231, an encrypting portion 2232 to carry out an encryption processing to the packet generated and a decoding portion 2233 to carry out a decode processing to the packet obtained from the DB server. The packet generating means (DB-VPN driver) 223 further includes a compressing-expanding portion 2234 to carry out a compression/expansion processing to a transmit/receive packet.

As shown in FIG. 5, the DB server 4 has a packet converting means (DB-VPN service) 423 to convert the packet command, transmitted from the client computer 2, complying with the DB command transmission protocol independent of the network circuit into a DB operation command, a DBMS invoking means (ODBC driver) 424 to be implemented with an interface independent of a database management system (DBMS) in use and common to general DBMSs, to invoke the DBMS, and to instruct the DBMS to execute the DB operation command, a DBMS 425 to execute the DB operation command having obtained via the DBMS invoking means and to reflect an executed result on the DB, and an interface means (TCP-IP communication driver) 422 to execute communication complying with a protocol necessary for exchanging the packet with the client computer. As shown in FIG. 11, the packet converting means (DB-VPN service) 423 includes, besides a command-converting body portion 4231, a decoding portion 4233 to carry out a decode processing to the packet received from the client computer 2 and an encrypting portion 4232 to carry out an encryption processing to the packet to be transmitted to the client computer 2. The packet converting means further includes a compressing-expanding portion 4234 to carry out a compression/expansion processing to a transmit/receive packet.

With the above structure, since the DB of the server 4 can be operated from the client computer 2, the DB engine (the ODBC driver) is not necessary for the client 2, and a special protocol for connecting the DB engines is therefore not necessary, that is, only the TCP-IP communication driver generally used for the computer-communication connection is available. And, though the Internet connection communication using the ISDN circuit or the Internet exclusive circuit is used, perfect communication security can be provided by carrying out the encryption. According to the present invention, the real-time and safe information transmission/receiving is attained with the command transmission protocol independent of the communications circuit. And, since every file is gathered on the DB server 4(5) and the client computer 1(2,3) is (are) connected with the DB server 4(5) by way of the Internet 6, data can be transmit-received in real time by always referring to the new master. As a matter of course, for example the sales information, at the point of sales, of all the stores has been gathered on the DB server 4(5), a next merchandise sales strategy can be decided any time. That is, since the TCP-IP communication driver is implemented on the terminal unit, an environment capable of checking the current situation in real time can be provided by the connection with the Internet any time and anywhere.

In the network-type data transmission system wherein a DB server 4(5) and a plurality of client computers 1,2,3 sharing the DB server 4(5) are connected by way of a network circuit 6, the client computer (terminal unit) in the inventive network-type data transmission system comprises a means to issue a circuit connection demand to the DB server 4(5) each time data is collected and to await a circuit connection approval from the server, a means to get the circuit connection approval from the server and to issue a DB opening demand, a means to get a DB opening processing response by the DB server and to issue a DB retrieval demand, a means to get a DB retrieval processing response by the DB server and to issue a DB updating demand, a means to get a DB updating processing response by the DB server and to issue a DB closing demand, a means to get a DB closing processing response by the DB server, to issue a DB circuit disconnection demand, and to await a circuit disconnection approval from the DB server, and a means to get the circuit disconnection approval by the DB server and to close a processing for collecting data. Each of the above means is included in the DB-VPN driver 223 shown in FIG. 4 and FIG. 9.

The client 1(2,3) further comprises a means to issues a circuit connection demand to another multiplexed DB server 4(5) when the client 1(2,3) issues the circuit connection demand to the DB server 4(5) and does not receive any response for a predetermined period of time. Therefore, a safety measures for failure, besides easiness of connection, can be provided.

Further, as shown in FIG. 8, the client 1(2,3) further comprises, in the issuance of the DB opening demand, a means to issue the connection demand to a DB server 4(5) corresponding an address and to await a connection response from the DB server 4(5), a means to get the response from the DB server 4(5), to make a random seed, and to encrypt, and transmit, the random seed, a means to issue an authentication demand to the DB server 4(5) and to await an authentication by the DB server 4(5), a means to get an authentication response from the DB server 4(5) and to decode, and take in, an authentication result, a means to generate a DB opening command, to which at least an object name, address, and ID are set as initial parameters, when the authentication is successful, to encrypt, and transmit, the DB opening command to the DB server 4(5), and to await a response from the DB server 4(5), and a means to get an opening response from the DB server 4(5) and to decoded, and take in, a response result. Each of the above means is included in the DB-VPN driver 223 shown in FIG. 4 and FIG. 9.

With the above, security is improved. The terminal unit further comprises a retrying means to admit a failure of the authentication and a failure of the DB connection by a predetermined number of times and to retry the authentication process and the DB connection process by the predetermined number of times.

In order to solve the above problems, as shown in FIG. 1, in an inventive computer-readable recording medium having recorded a client program used for a client computer 1(2,3) in a network-type data transmission system wherein a DB server 4(5) and a plurality of client computers 1,2,3 sharing the DB server 4(5) are connected by way of a network circuit 6, the client program comprises a step (S202, S203) to issue a circuit connection demand to the DB server 4(5) each time data is collected and to await a circuit connection approval from the DB server 4(5), a step (S203) to get the circuit connection approval from the DB server 4(5) and to issue a DB opening demand, a step (S204) to get a DB opening processing response by the DB server 4(5) and to issue a DB retrieval demand, a step (S205) to get a DB retrieval processing response by the DB server 4(5) and to issue a DB updating demand, a step (S206) to get a DB updating processing response by the DB server 4(5) and to issue a DB closing demand, a step (S207) to get a DB closing processing response by the DB server 4(5), to issue a DB circuit disconnection demand, and to await a circuit disconnection approval from the DB server 4(5), and a step (S208) to get the circuit disconnection approval by the DB server 4(5) and to close a processing for collecting data, and the client program executes the above steps each time data is collected through the client computer 1(2,3) as shown in FIG. 9 for example. The recording medium further comprises a step to issues a circuit connection demand to another multiplexed DB server when the client computer issues the circuit connection demand to the DB server and does not receive any response for a predetermined period of time. Therefore, a safety measures for failure, besides easiness of connection, can be provided.

As shown in FIG. 8 for example, the step to issue the DB opening demand comprises a step (S801, S802) to issue the connection demand to a DB server 4(5) corresponding an address and to await a connection response from the DB server 4(5), a step (S803) to get the response from the DB server 4(5), to make a random seed, and to encrypt, and transmit, the random seed, a step (S804, S805) to issue an authentication demand to the DB server 4(5) and to await an authentication by the DB server 4(5), a step (S805) to get an authentication response from the DB server 4(5) and to decode, and take in, an authentication result, a step (S806, S807) to generate a DB opening command, to which at least an object name, address, and ID are set as initial parameters, when the authentication is successful, to encrypt, and transmit, the DB opening command to the DB server 4(5), and to await a response from the DB server 4(5), and a step (S808) to get an opening response from the DB server 4(5) and to decoded, and take in, a response result. The recording medium further comprises a step to admit a failure of the authentication and a failure of the DB connection by a predetermined number of times and to retry the authentication process and the DB connection process by the predetermined number of times.

As shown in FIGS. 1, 9, in a computer-readable recording medium having recorded a sever program used for a DB server 4(5) in a network-type data transmission system wherein a DB server 4(5) and a plurality of client computers 1,2,3 sharing the DB server 4(5) are connected by way of a network circuit 6, the server program comprises a step (S401) to receive a circuit connection demand from the client computer 1(2,3) and to transmit a connection approval, a step (S403) to receive a DB opening demand from the client computer 1(2,3) and to issue a DB operation command for a DB opening processing to a DBMS, a step (S404) to receive a DB opening processing result by the DBMS and to respond to the client computer 1(2,3) having made the demand, a step (S405) to receive a DB retrieval demand from the client computer 1(2,3) and to issue a DB operation command for a DB readout to the DBMS, a step (S406) to get a DB retrieval processing response by the DBMS and to respond to the client computer 1(2,3) having made the demand, a step (S407) to receive a DB updating demand from the client computer 1(2,3) and to issue a DB operation command for a DB updating processing to the DBMS, a step (S408) to get a DB updating processing response by the DBMS and to respond to the client computer 1(2,3) having made the demand, a step (S409) to receive a DB closing demand from the client computer 1(2,3) and to issue a DB operation command for a DB closing processing to the DBMS, a step (S410) to get a DB closing processing response from the DBMS and to respond to the client computer 1(2,3) having made the demand, and a step (S411) to receive a circuit disconnection demand from the client computer 1(2,3) and to transmit a circuit disconnection approval to the client computer 1(2,3) having made the demand, and each time data is collected by the client computer 1(2,3), the server program executes the above steps so as to process the data.

As shown in FIG. 8 for example, the step to receive the DB opening demand from the client computer 1(2,3) and to issue the DB operation command for the DB opening processing to the DBMS comprises a step (S901) to receive a circuit connection demand from the client computer 1(2,3) and to await a server circuit connection, a step (S902) to generated a client task after the server circuit connection and to respond to the client computer 1(2,3) having made the demand, a step (S903-S906) to receive an authentication demand from the client computer 1(2,3), to await a server authentication, to decode a random seed obtained, and to encrypt a result of the authentication so as to respond to the client computer 1(2,3) having made the demand, and a step (S907) to receive a DB opening command from the client computer 1(2,3), to decode the DB opening command, and to issue a DB operation command for entrusting a DB opening processing to the DBMS, and a step (S908) to encrypt a DB opening processing result and to respond to the client computer 1(2,3) having made the demand. The step (S405) to receive a DB retrieval demand from the client computer 1(2,3) and to issue a DB operation command for a DB readout to the DBMS 425 comprises a step to execute a command list prepared for a retrieval with respect to the opened DB on a basis of input data from the client computer, and a step to successively read in record data until required data is found and to take in contents of the required data when the required data is found, by executing the command list. And, the step (S407) to receive a DB updating demand from the client computer 1(2,3) and to issue a DB operation command for a DB updating processing to the DBMS comprises a step to store data on a work memory, and a step to finally write in the DB so as to reflect the serial DB work.

In order to solve the above problems, in the sales management system using the inventive network-type data transmission method in the client server system using the Internet 6 shown in FIG. 1 as a communication medium, as shown in FIG. 12 for example, the client computer 1(2,3) has a first viewer 121 to display store-and-forward type data existing in a homepage or in a local memory medium and a second viewer 122 to get real-time access to, and display, data successively updated and existing in the DB server, and the server 4(5) has various sales data for merchandise master, sales, stock, sales amount, a DB wherein data for sales promotion including news programs is accumulated while linking to the sales data, a DB server to execute merchandise inquiry and collection of sales information by executing retrieval, addition, updating of the sales data and sales promotion data, and a server body to inform of the sales data and sales promotion data to unspecified number of client computers 1,2,3 by using a homepage, to receive responses against the homepage, to reflect collected contents on the DB, and to inform the collected contents to the client computers 1,2,3 in real time.

In the above structure, marketing information is delivered to unspecified number of client computers 1,2,3 by way of the Internet 6, the DB server 4(5) historically manages responses from the client computers 1,2,3 and analyzes user needs, data for sales promotion made on a basis of the analysis and distributed to the client computers 1,2,3 are recorded on a recording medium, and the data for sales promotion is regenerated through the first viewer 121.

As above, the information transmission with low cost is executed by using the Internet broadcasting for an information notification, user needs is collected and analyzed in real time by the Internet market research linked to the Internet broadcasting, and an interactive banner in a virtual world is realized by using the recording medium for sales promotion effectively made on the basis of the result of the above, whereby the merchandise introduction easy to be understood is realized. And, a precise and effective sales promotion can be attained with the minimum cost.

BRIEF DESCRIPTION OF THE DRAWINGS

FIG. 6 is a flowchart of a POS sales data write processing.

FIG. 7 is a table of a command system used in the present invention.

FIG. 8 is a flowchart of the OpenDatabase command of FIG. 7.

FIG. 9 is a flowchart of the entire operation executed by the client each time of data collection.

BEST MODE OF THE INVENTION

Figure 1:
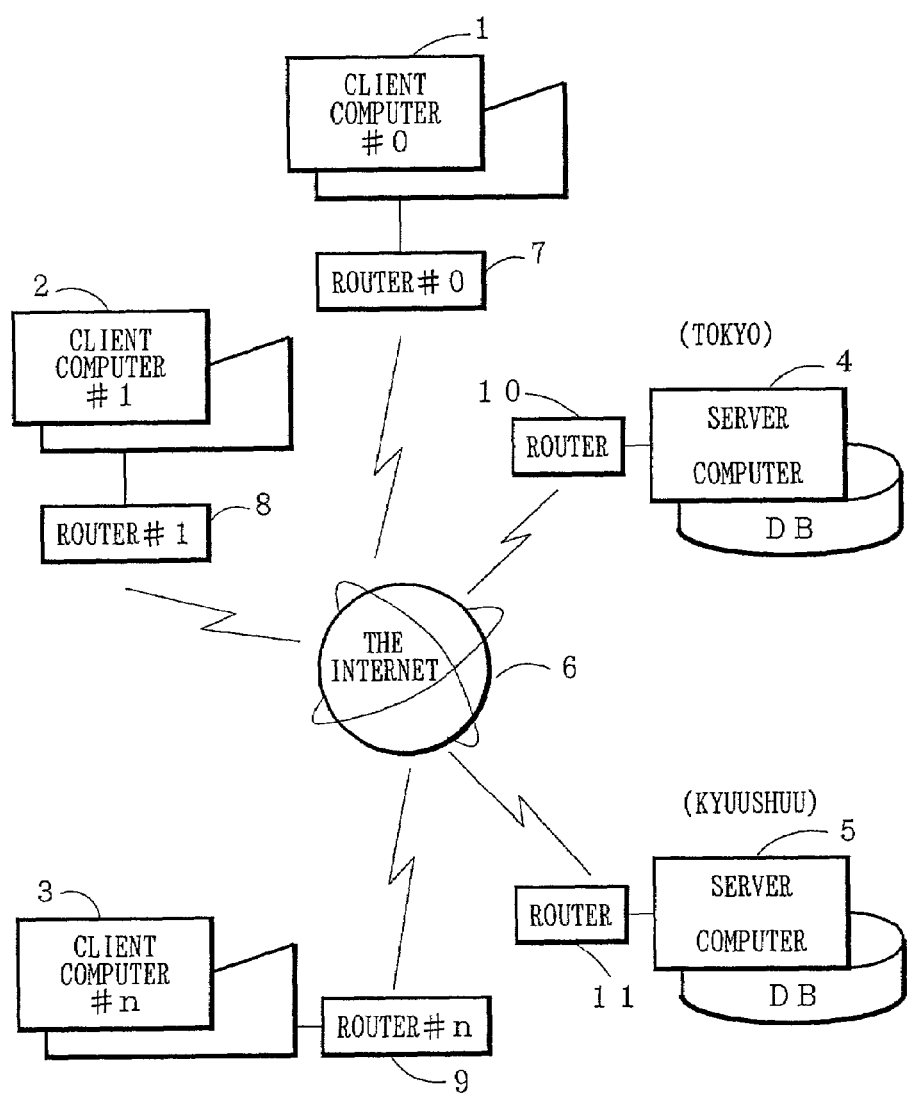
FIG. 1 is a schematic diagram showing an embodiment of the present invention.

FIG. 1 is a schematic diagram showing an embodiment of the inventive network-type data transmission system. In the figure, reference numerals 1,2,3 denote terminal units (client computers) each using a general-purpose personal computer as a core and having some peripheral device such as a journal printer and a bar code reader in order to realize the function as a POS (Point Of Sales) terminal. The details are described later.

Numerals 4,5 are the server computers, each of which self-contains a database (hereinafter, DB) in which all the necessary information like the merchandise master is gathered. The server computers 4,5 are multiplexedly provided, for example, in Tokyo and Kyuushuu, respectively, for safety. 6 is the Internet, to which the client computers 1,2,3 and the servers 4,5 are connected through routers 7,8,9,10, 11.

Here, though the Internet is exemplified as a network circuit 6, a frame relay is available by thinking highly of safety.

Figure 2:
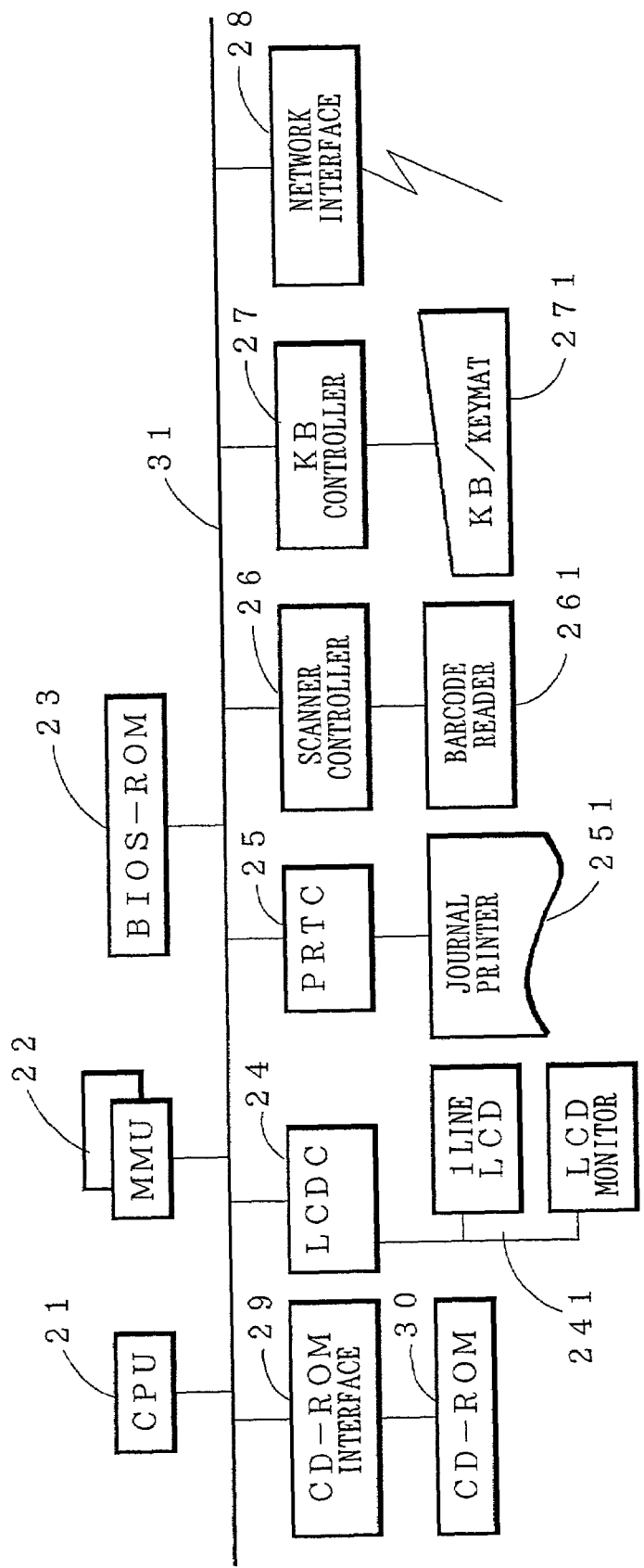
FIG. 2 is a block diagram showing an internal configuration of a client computer on FIG. 1.

FIG. 2 is a block diagram showing an internal configuration of the client computer (the terminal unit) 2 on FIG. 1. 21 is the CPU (Central Processing Unit), which performs the arithmetic logic operation according to the programs stored in a main storage 22 and a ROM 23 and controls various peripheral units connected to the present system. The main storage 22 has a RAM. The memory allocation structure of the program on the main storage is shown as a memory map in FIG. 4.

Figure 4:
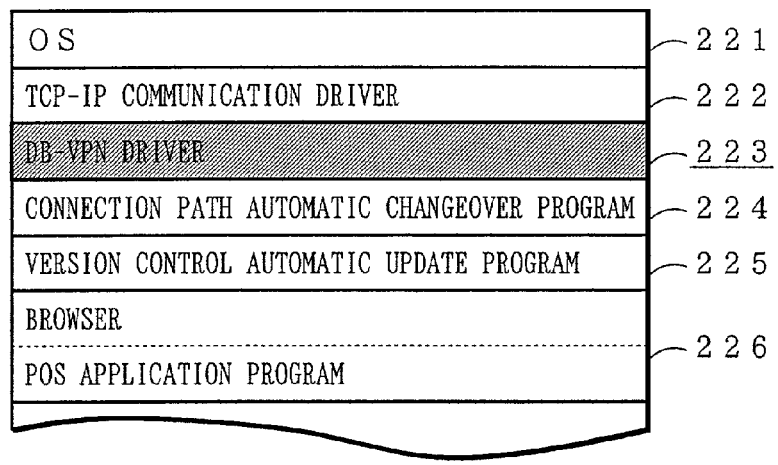
FIG. 4 is a schema showing a memory allocation structure of a program on a main storage of a client computer on FIG. 1.

In FIG. 4, 221 is an operating system (OS), and Windows 98 (Microsoft, U.S.A.) is used as the OS in the present embodiment. 222 is a communication driver equipped with the TCP-IP protocol being normally used for the connection with the Internet.

Figure 10:
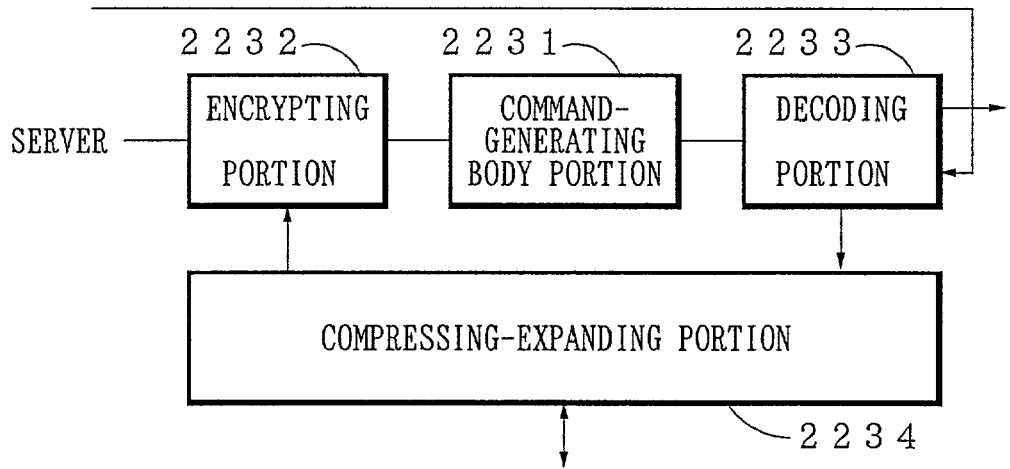
FIG. 10 is a block diagram showing an internal configuration of the DB-VPN driver on FIG. 4.

223 is an inventive driver to generate a packet command complying with a command transmission protocol independent of the network circuit. In this driver 223, a module for making the encryption, decode, compression, and extension for the generated packet is included. Here, this driver 223 is named DB-VPN (Virtual Private Network) driver. FIG. 10 is a block diagram showing an internal configuration of the DB-VPN driver on FIG. 4. The DB-VPN driver 223 consists of a command generation portion body 2231, an encrypting portion 2232, a decoding portion 2233, and a compressing-expanding portion 2234. The details are described later.

Referring to FIG. 4, numerals 224,225,226 denote application programs; that is, a connection path automatic changeover program (224) to select another line or circuit when the DB server is busy, a version control automatic update program (225) to automatically download and use the revised program when the program used at the server 4(5) is revised or changed, and a POS program (226) to generate data for conducting merchandise management, sales management, and inventory control, which POS program includes a browser for executing merchandise quantity calculation, money-amount calculation, consumption tax calculations.

Again referring to FIG. 2, 23 is a BIOS-ROM in which a BIOS (basic input output control system) program to control peripheral units connected thereto is stored. Numerals 24,25, 26,27,29 are input and output controllers (that is, display controller: LCDC, printer controller: PRTC, scanner controller, KB controller, CD-ROM interface), which controls LCD display 241 including a line display, a journal printer 251 to issue a receipt, a barcode reader 261, a keyboard or keymat 271, and a CD-ROM30 respectively. 28 is a network interface made up of, for example, a modem card and connected to the server 4(5) by way of the communications circuit network including the Internet 6.

31 is an input-output bus having lines for data, address, and control, and through this input-output bus 31 the above blocks 21,22,23,24,25,26,27,28,29 do data-communication mutually to realize each function. Here, the above structure can be suitably changed with the scale of store.

Figure 3:
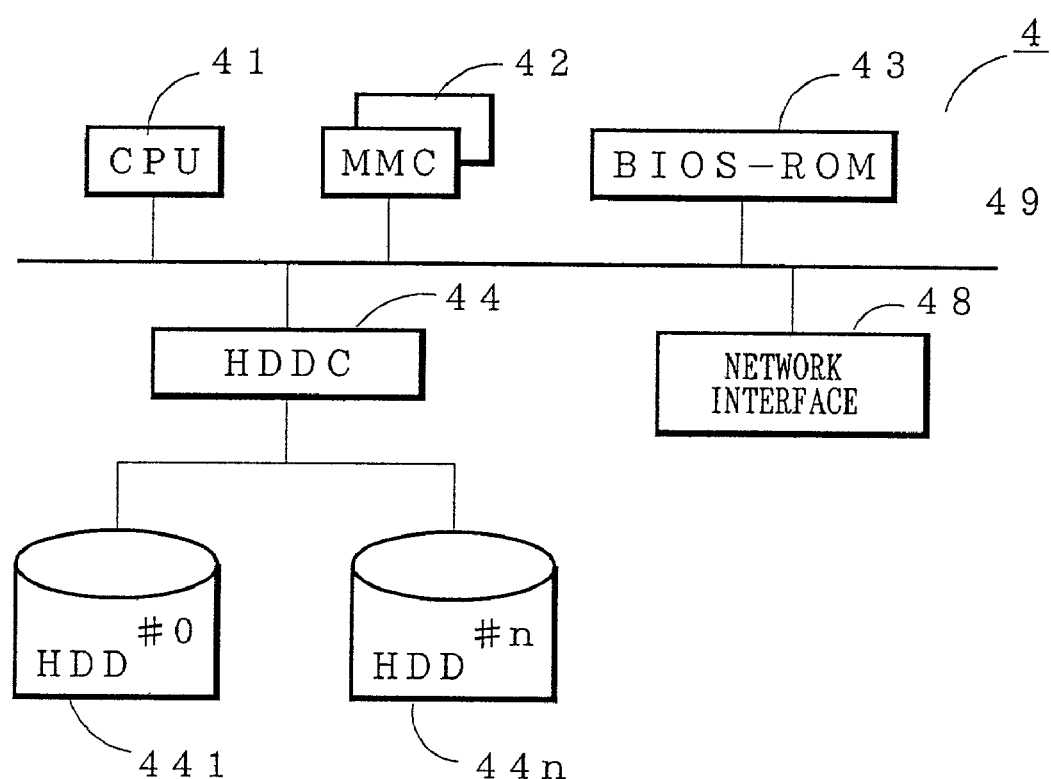
FIG. 3 is a block diagram showing an internal configuration of a server computer on FIG. 1.

FIG. 3 is a block diagram showing an internal configuration of the server computer 3 on FIG. 1. In this figure, 41 is a CPU being a control center, which executes the arithmetic logic operation according to the program stored in the main storage 42 and the ROM 43 and controls various peripheral units connected to the present system. The main storage 42 is made up of RAMs, and FIG. 5 is a schema showing a memory allocation structure of a program on the main storage 42.

Figure 5:
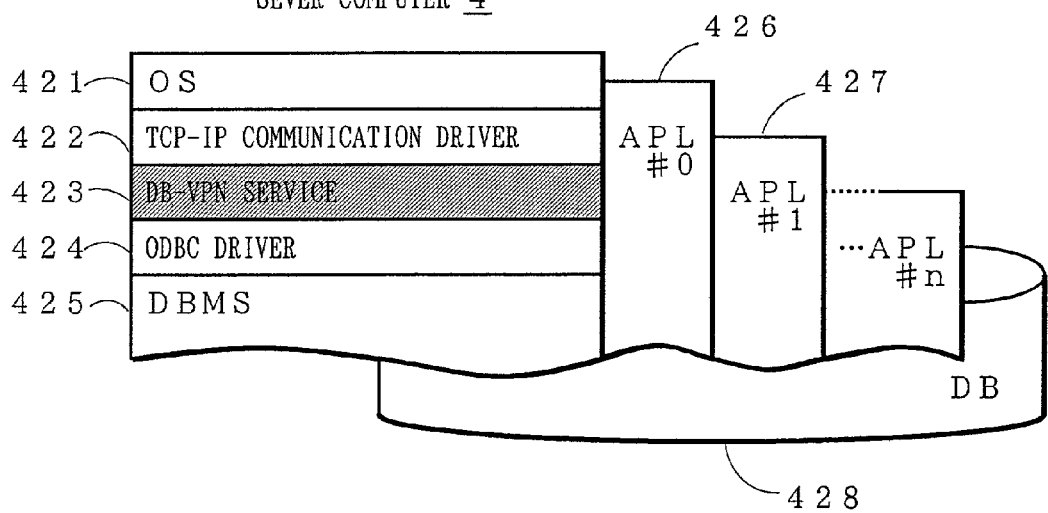
FIG. 5 is a schema showing a memory allocation structure of a program on a main storage of a server computer on FIG. 1.

In FIG. 5, 421 is an operating system (OS), and Windows NT (Microsoft, U.S.A.) is used as the OS in the present embodiment. 422 is a communication driver equipped with the TCP-IP protocol being normally used for the connection with the Internet.

Figure 11:
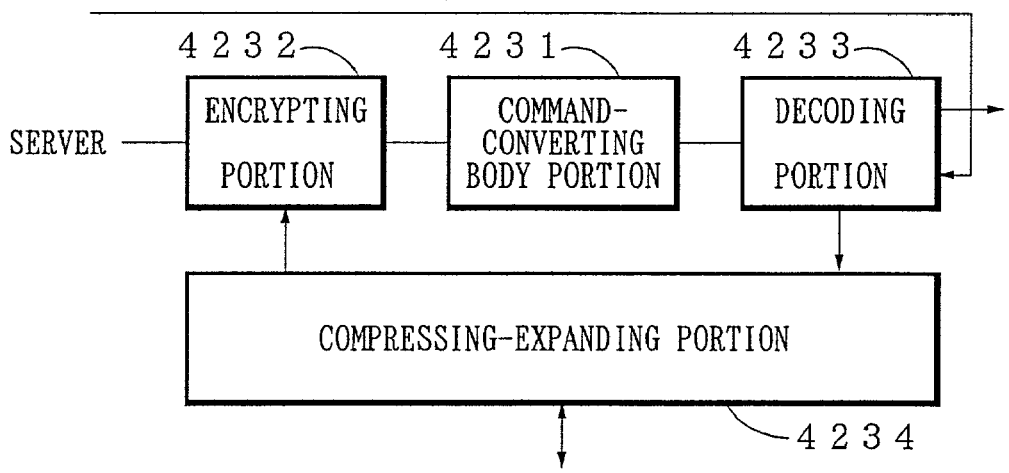
FIG. 11 is a block diagram showing an internal configuration of the DB-VPN service on FIG. 5.

423 is a DB-VPN (Virtual Private Network) service provided in the present invention, which service converts a packet command complying with the DB command transmission protocol independent of the network circuit into the corresponding DB operation command when received the packet command from the client computer 2 and answers a DB operation command execution result to the client 1 (2,3) in real time. In this answer of response, modules to encrypt, decode, compress, and extend the generated packet are included. The internal configuration of the DB-VPN service is shown FIG. 11. As shown in FIG. 11, the DB-VPN service consists of the command-converting body portion 4231 as a core, the encrypting portion 4232, the decoding portion 4233, and the compressing-expanding portion 4234. The details are described later.

Again referring to FIG. 5, 424 is a DB engine, is dependent on the OS 421 in use, and is a driver software (ODBC: Open DataBase Connectivity) providing a common interface to invoke a DBMS 425. The above 425 is a database management system (DBMS: Database Management System) to integrally manage the DB. Here, the SQL server (Microsoft, U.S.A.) is used. However, the Oracle server (ORACLE, U.S.A.) may be used. 426,427 are application programs; that is, the former is a software module to realize the Internet broadcasting system, and the latter is also a software module to realize the Internet market research system. The details of the above two systems are described later. 328 is a database (DB), which is made by using the Access (Microsoft) here.

Again referring to FIG. 3, 43 is a BIOS-ROM, in which a BIOS (basic input output control system) program to control peripheral units connected thereto is stored. 44 is a hard disk controller (HDDC), in which the above DB 428 is stored, and which performs the format control and the read/write control of a large capacity hard disk drive (HDD) 441-44n connected through the input-output bus 49. Though not illustrated, similarly to the personal computer shown in FIG. 2, peripheral units such as a LCD (liquid crystal display) monitor, a keyboard, a network interface are connected to the input-output bus 49 through exclusive input and output controllers.

FIGS. 6-9 explain the operation of the embodiment of the present invention. FIG. 6 is a flowchart of a POS sales data write processing. FIG. 7 is a table of a command system used in the present invention. FIG. 8 is a flowchart of the OpenDatabase command of FIG. 7. FIG. 9 is a flowchart of the entire operation executed by the client each time of data collection.

Referring to FIGS. 6-9, the operation of the inventive embodiment shown in FIGS. 1-5 will be described in detail.

FIG. 6 shows a flow of the processing of the POS application program 226 executed at the register work carried out each time of selling the merchandise to a customer.

Specifically, first the bar code reader 261 or the keyboard 271 is operated by a register operator being normally a store employee. With this, a merchandise quantity calculation, a money-amount calculation, a consumption tax calculation are executed (Step S61), and a necessary result is each time informed to a customer by means of the line display 241.

Next, the registration (Step S62) and the adding up of the merchandise (Step S63) are executed by the CPU 21, and a database connecting work to the server computer 4(5) is started through the network interface 28. This database connecting work is explain in detail hereinafter. Here, the database connecting work is also carried out for each of the merchandise quantity calculation, the money-amount calculation, and the consumption tax calculation at Step S61.

Here, when the time-out occurs by any reason such as the circuit-busy, no connection is informed. The processing is entrusted to the connection path automatic changeover program 224, and a database connecting work with another path is started. For example, when the server computer 4 in Tokyo is failed to be connected, the server computer 5 in Kyushu is accessed. And, a maximum of five error retryings at the later-described file updating is executed (Step S65). This is a relieving action for a later-described authentication error and for a case of no response from the server computer 4(5) after the database connection. When an error occurs after the five retrial, a re-registration is promoted.

And, the system goes to the write processing work of the real sales data. That is, the data writing is carried out for the files, in the connected server computer 5(6), such as a stock master (m_stok_master), a receiving and shipping file (m_inout), a trade total (m_total), a daily task total (m_daytotal), a customer class analysis (m_kyaku), and a receipt (m_receipt). In the stock master (m_stok_master), first the existence of that merchandise is checked (Step S66). If exists, the updating is executed (Step S67), and if not exists, the new writing is executed (Step S68). Here, when an error arise during the file updating, the retrying of five times at the maximum is executed (Step S65). The above stock master writing work is repeated by the number of lines of the master (Step S69).

In the receiving and shipping file (m_inout), the receiving and shipping new writing processing (Step S70) is repeated by the number of lines (Step S71). In the trade total (m_total), the total is newly written in (Step S72). In the daily task total (m_daytotal), the existence of the daily task total file is checked (Step S73). The total is updated if exists (Step S74, and the daily task total is newly written in if not exists (Step S75). In the customer class analysis (m_kyaku), the customer class data is newly written in (Step S76). In the receipt (m_receipt), the existence of a receipt is checked (Step S77). An receipt number is updated if exists (Step S78), and a new writing of the receipt number is executed if not exists (Step S79).

Here, each time the client computer 2 executes the retrieval, the addition, the updating, the deletion with respect to sales data, that is, on each of the above steps of S64, S65, S66, S67, S68, S70, S72, S74, S75, S76, S77, S78, S79, the client computer 2 and the server 4 execute the operation of FIG. 9.

That is, actually the client computer 2 and the server computer 4 are connected to each other with the procedure shown in FIG. 9, the processings are executed, and the client computer 2 and the server computer 4 are cut off, though the client computer 2 are executing a database connecting work at Step S64 shown in FIG. 6.

Specifically, first the client computer 2 issues a circuit connection demand to the server computer 4 by way of the Internet 6 (Step S201). Here, the protocol for the circuit connection and the circuit disconnection complies with the TCP-IP protocol normally used for the Internet connection. Next, the client computer 2 awaits a circuit connection approval (Step S401) of the server computer 4 and issues a store approval demand, (Step S202). And, the client computer 2 awaits the store approval (Step S402) by the server computer 4 and issues a DB opening demand (Step S203).

The server computer 4 having received the DB opening demand by way of the Internet 6 sends the DB opening demand to the DBMS 425 by way of the ODBC driver 424, and an opening processing (Step S412) of the DB 428 is executed by the DBMS 425. The server computer 4 having got a DB opening result (Step S403) informs the demanding client computer (i.e. the client computer having made the demand) 2 of the result, and the client computer 2 generates a DB retrieval demand packet and transmits it (Step S204). The server computer 4 having received the DB retrieval demand by way of the Internet 6 invokes the DBMS 425 through the ODBC driver 424 and make the DBMS 425 execute a DB retrieval processing (Step S413). The server computer 4 gets the retrieval result, generates a packet (Step S406), and transmits the packet to the demanding client computer 2 by way of the Internet 6.

The client computer 2 having got the DB retrieval result further generates a packet for a DB updating demand and transmits it by way of the Internet 6 (Step S205). The server computer 4 receives this and makes the DBMS 425 execute the DB updating processing through the ODBC driver 424 (Step S414). The server computer 4 receives the DB updating processing result from the DBMS 425, generates a transmitting packet (Step S408), and transmits it to the demanding client computer 2 by way of the Internet 6. Subsequently the client computer 2 generates a DB closing demand packet and transmits it to the server computer 4 by way of the Internet 6 (Step S206). The server computer 4 invokes the DBMS 425 through the ODBC driver 424 to instruct the DB closing processing (Step S415). The server computer 4 further gets the DB closing result from the DBMS 425 and informs the demanding client computer 2 of the situation (Step S410). The client computer 2 issues a circuit disconnection demand (Step S207), awaits the circuit disconnection approval of the server computer 4 (Step S411), and closes the serial processings for the sales data collection (Step S208).

Here, the exchange of the packet between the client computer 2 and the server computer 4 by way of the Internet 6 is executed through the DB-VPN driver 223 of the client computer 2 and the DB-VPN service 423 of the server computer 4.

The DB-VPN driver 223 generates the packet command complying with the command transmission protocol independent of the network circuit in use whenever the client computer 2 issues the DB opening demand (Step S203), the DB retrieval demand (Step S204), the DB updating demand (Step S205), the DB closing demand (Step S206). The details about the command format and so on are describes later with reference to FIGS. 7 and 8. And, the processings for the encryption, decode, compression, and expansion are added each time of the exchange of the packet, which are also described later.

The DB-VPN service 423 has a function of converting the packet command generated by the DB-VPN driver 223 into the DB operation command such as a SQL (Structured Query Language) statement, invokes the DBMS 425 through the ODBC driver 424, and makes the DBMS 425 execute the DB operation command, thereby responding to the demand from the client computer 2 in real time. And, similarly to the DB-VPN driver 223, the processings for the encryption, decode, compression, and expansion are added each time of the change of the packet. The details about the above processings are described later.

Here, since a SQL server is used as the DBMS 425, the data in the DB 428 is formed as a table of matrix. With respect to the defined table, the SQL statement provides the function of insertion (INSERT), deletion (DELETE), updating (UPDATE), and selection (SELECT) of data. An operation object is collectively designated as a set in the set-operation, and, on the other hand, the operation of each line is executed with a cursor. In the cursor operation, the objective data is designated by a cursor declaration as an inquiry, the cursor is OPENed, the line is fetched (FETCH) one by one, the above deletion (DELETE) or the updating (UPDATE) is executed, and the cursor is closed (CLOSE), thereby executing the DB operation.

FIG. 7 is a table of a command system used in the present invention. The commands are generated by the DB-VPN driver 223 equipped on the client computer 1 (2,3) and interpreted. Twelve commands, i.e. Register command, Setserverip command, Setid command, Setoption command, OpenDatabase command, CloseDatabase command, ExecuteSQL command, Fetchnextrecord command, GetcurRecord command, CommitTransaction command, RollbackTransaction command, and Getlasterror command, are newly made.

The Register command registers a serial number and has, as the parameter, an object name and a serial number to register. The Setserverip command sets an IP address and a domain name and has, as the parameter, an object name, an IP or domain name flag, an IP address, and a domain name. The Setid command sets ID and has an object name, a store code, and a store key as the parameter. The Setoption command is a flag to set indication or non-indication of a dialog of "an access error by way of TCP-IP" and has, as the parameter, an object name and an access & error by way of TCP-IP flag.

The OpenDatabase command opens the DB and has, as the parameter, an object name, a store code, a store password, and a POS number. The CloseDatabase command closes the DB and has, as the parameter, only an object name. The ExecuteSQL command transmits the SQL statement and has, as the parameter, an object name and the SQL statement.

The Fetchnextrecord command, the GetcurRecord command, the CommitTransaction command, the RollbackTransaction command, and the Getlasterror command each has only an object name as the parameter. The Fetchnextrecord command selects the line of data having been read in, the GetcurRecord command reads in data, the CommitTransaction command updates data, the RollbackTransaction command executes cancellation of data, and the Getlasterror command indicates error contents.

With regard to the DB opening processing, the command list is as follows. Here, the object name is "vjxsql". Specifically, the DB-VPN driver 223 shown in FIG. 4 is described, while referring to the flowchart of FIG. 8.

On Open DB
   Set pobj = new (xtra"vjxsql")
   Register (pobj,"VVV000-00000-00000-00000")
   Setserverip (pobj,0,000.000.00.000)
   Setid (pobj,0000001,"AAAAAAAA")
   Setoption (pobj,16)
   OpenDatabace (pobj,"0000001","0001","01")
End The DB closing is as follows.

On Close DB
   CloseDatabase (pobj)
   Set pobj=0
End

Referring to the flowchart of FIG. 8, a specific processing flow of the client computer 2 and the server computer 4 upon the issuance of the OpenDatabase command through the DB-VPN driver 223 is described. Specifically, the processing here includes the database opening demand (Step S403) of the server 4(5) on FIG. 9, the database opening processing (Step S412) of the DBMS 425, and the database opening result (Step S404) of the server 4(5).

Specifically, the client computer 2 issues the connection demand to the corresponding DB server according to the IP address and the port address which the server computer 4 has and awaits the connection response from the DB server (Step S801). The server computer 4 is in a server circuit connection waiting condition (Step S901), generates the client task (Step S902) after getting the server circuit connection demand, and responds to the client computer 2. The client computer 2 having received the response makes the random seed, and the encryption due to the store key is carried out by the encrypting portion 2232 (Step S803). Here, a parameter having set by the Setid command is used as the store key. The encryption and encode are performed by using parameters called an encryption key and decode key, respectively. The conventional cryptosystem representative of DES (Data Encryption Standard) system or the public-key cryptosystem representative of the RSA cryptosystem is applicable.

The client computer 2 further issues the authentication demand to the server 110 computer 4 on the basis of an store number and an encrypted random seed and awaits the authentication by the server (Step S804). At the server computer 4, the decoding portion 4233 retrieves the store key from the store number (Step S904), and the decode of the random seed by the store key is executed (Step S905). And, the encryption of the authentication result is carried out by the encrypting portion 4232 with the random seed and the store key (Step S906), and an authentication response is executed by way of the Internet 6. Here, the demanding client computer 2 is informed of an authentication error when the store key is not retrieved at Step S904.

The client computer 2 is waiting for the server authentication. Upon receiving the authentication result, the decode is executed (Step S805). The OpenDatabase command is generated by the command-generating body portion 2231 when the authentication is successful Further, the encryption processing is carried out by the encrypting portion 2232 (Step S806), and the OpenDatabase command is transmitted (Step S807). The server computer 4, received the DB opening demand by way of the Internet 6, decodes the DB opening command at the decoding portion 4233, converts it into the SQL statement at the command-converting body portion 4231, invokes the DBMS 425 through the ODBC service 424, and issues the SQL statement for the DB opening (Step S907). And, the server computer 4 encrypts the opening result by way of the ODBC service 424 and returns the DB opening response to the demanding client computer 2 (Step S908).

The client computer 2 awaiting the server response decodes the response result at the decoding portion 22333 (Step S808) and normally closes if opening-success. If failure, a chance of not more than five retrials is given as an error as shown in the flowchart of FIG. 6. An authentication error or no server response is similarly processed.

Here, the command list of reading the sales data is as follows.

On getDBsales SQLST
    If ExecuteSQL (pobj,SQLST) < > 0 then
    Put Getlasterror (pobj)
    Put−1 into chooseList
    Else
    Put Fetchnextrecord (pobj) into A
    If A < > −1 then
      Put GetCurRecord (pobj) into chooseList
    Else
      Put −1 into chooseList
    End if
    End if
    Return chooseList End The database retrieval demand (Step S405) by the server 4(5) on FIG. 9, the database retrieval processing (Step S413) by the DBMS 425, and the database retrieval result (Step S406) by the server 4(5) are specified as above. Here, based on the merchandise data inputted by the bar code reader 261 and the keyboard 271, the server 4 transmits, for example, the SQL statement to retrieve the stock master toward the DBMS 425 and reads the contents in the opened DB 428 while selecting the record (line) until required data is found. Specifically, the command line is written in the SQLST. This command line (referring to FIG. 4, for example the stock master about a merchandise code be retrieved and updated) is executed. "0", if normal, or "error", if abnormal, is returned (Put Getlasterror). And, "−1" is set to the variable "ChooseList". In other cases, the next record is fetched (Fetchnextrecord) and the contents are set to the register A for example. When there exists a next record, the order is set to "ChooseList". When no record exists, "−1" is set, and the process closes.

The command list of the sales data storage is as follows.

On setDBsales SQLST
    If ExecuteSQL (pobj,SQLSI) < > 0 then
    Put Getlasterror (pobj)
    Else
    CommitTransaction (pobj)
    End if End The database updating demand (Step S407) by the server 4(5) on FIG. 9, the database updating processing (Step S414) by the DBMS 425, and the database updating result (Step S408) by the server 4(5) are specified as above. Here, the DB-VPN service 423 transmits the command to execute the storage of data on the work of the DBMS 425 and issues the CommitTransaction command so as to reflect the above serial DB operation on the DB 428. Specifically, the command written in "SQLIST" is executed, and the data is stored on the work memory. If not "0", "error" is returned (Put Getlasterror). In other cases, the preserving command (CommitTransaction) for the reflection on the DB 428 is issued, and the process closes.

As described above, the processings of encryption and decode are carried out between the client computer 2 and the server computer 4 each time the packet is exchanged. And simultaneously, the processings for compression and expansion are carried out through the compressing-expanding portion 2234 of the DB-VPN driver 223 and the compressing-expanding portion 4244 of the DB-VPN service 423. Since the encryption, decode, compression, and expansion can be carried out with the known method, their detailed description is omitted here.

Here, besides the above DB opening, commands for the retrieval (data reading), the updating (data storage), and the DB closing are prepared and can be executed similarly. That is, similarly to the above DB opening operation, the DB-VPN service 423 (the command-converting body portion 4231) converts them into the respective SQL statements, invokes the DBMS 425 by way of the ODBC driver 424, and operates the DB 428 correspondingly to each SQL statement. And, similarly to the DB opening operation, each time of the packet exchange between the client computer 2 and the server computer 4 the processings of the encryption and the decode are carried out.

As stated above, according to the inventive network-type data transmission method and system and the recording medium having recorded the method being programed, since the DB of the server can be operated from the client computer, the DB engine (the ODBC driver) is not necessary for the client, and a special protocol for connecting the DB engines is therefore not necessary, that is, only the TCP-IP communication driver generally used for the computer-communication connection is available.

And, though the Internet connection communication using the ISDN circuit or the Internet exclusive circuit is used, perfect communication security can be provided by carrying out the encryption. According to the present invention, the real-time and safe information transmission/receiving is attained with the command transmission protocol independent of the communications circuit. And, since every file is gathered on the host server and the client computer is connected with the server by way of the Internet, the POS data can be transmit-received in real time by always referring to the new master. As a matter of course, for example the sales information, at the point of sales, of all the stores has been gathered on the host server, a next merchandise sales strategy can be decided any time. That is, since the TCP-IP communication driver is implemented on the terminal unit, an environment capable of checking the current situation in real time can be provided by the connection with the Internet any time and anywhere.

Here, the above DB-VPN driver 223 and the DB-VPN service 423 are recorded on a recording medium as a middleware, distributed, and loaded, if necessary, into the client computer or the server computer. As a recording medium an optical disk such as the CD-ROM, a magnetic disc such as the HDD, and a semiconductor memory are available, or otherwise the program may be supplied through the communication medium.

Next, by applying the inventive network-type data transmission method and system and the recording medium having recorded the method being programed to sales promotion, an effective, high-quality, and integrated network-type sales promotion system can be constructed. That is, this network-type sales promotion system can be a network solution system, for the sales promotion, consisting of respective functions of an interactive CD-ROM sales promotion contents, the above server database, the Internet broadcasting, and the Internet market research. By introducing this system, the sales promotion using the computer can be applied to the Internet, an intranet, or an extranet.

Specifically, the information transmission with low cost is executed by using the Internet broadcasting for an information notification, user needs is collected and analyzed in real time by the Internet market research linked to the Internet broadcasting, and an interactive banner in a virtual world is realized by using the CD-ROM for sales promotion effectively made on the basis of the result of the above, whereby the merchandise introduction easy to be understood is realized. And, a precise and effective sales promotion can be attained with the minimum cost.

Figure 12:
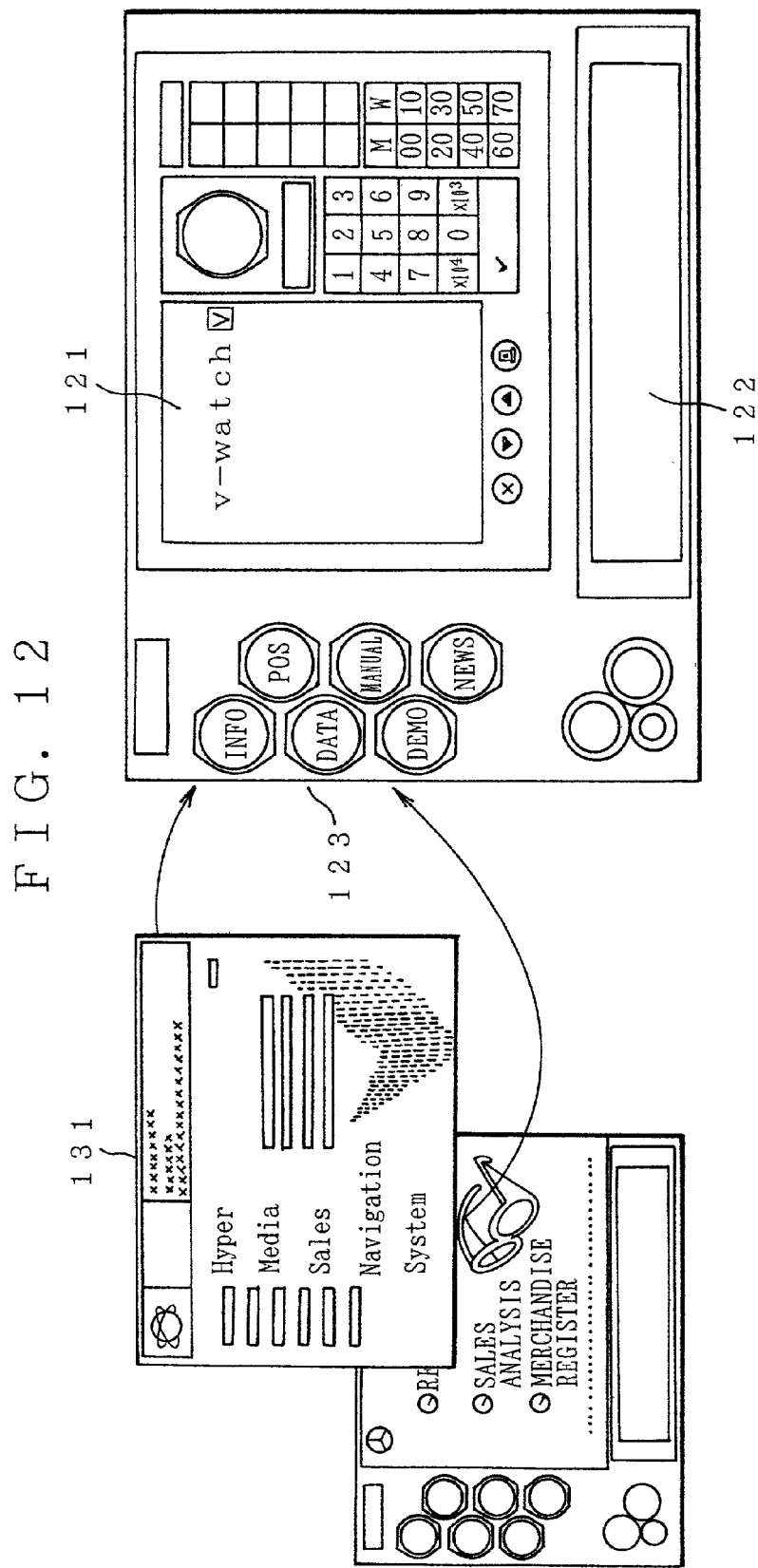
FIG. 12 is a schematic illustration of a display of a sales promotion system.

FIG. 12 is a schematic illustration showing a screen image of the viewer displayed by the LCD monitor 241 of the client computer 1(2,3) on FIG. 1. The screen image is mainly divided into a multi-media viewer 121 and a real-time viewer 122. The multi-media viewer 121 mainly displays store-and-forward type data, and the CD-ROM and the homepage are displayed on this area.

When the Web or CD-ROM, which have been registered, is selected by a channel changeover button 123, the image or picture is displayed on this area. The real-time viewer 122 is the one for displaying information updated in real time, wherein the successively updated data in the server is accessed automatically and the latest data can be always displayed. There are two updating method; that is, a user goes to take data or receives data sent from the server according to a program table.

Figure 13:
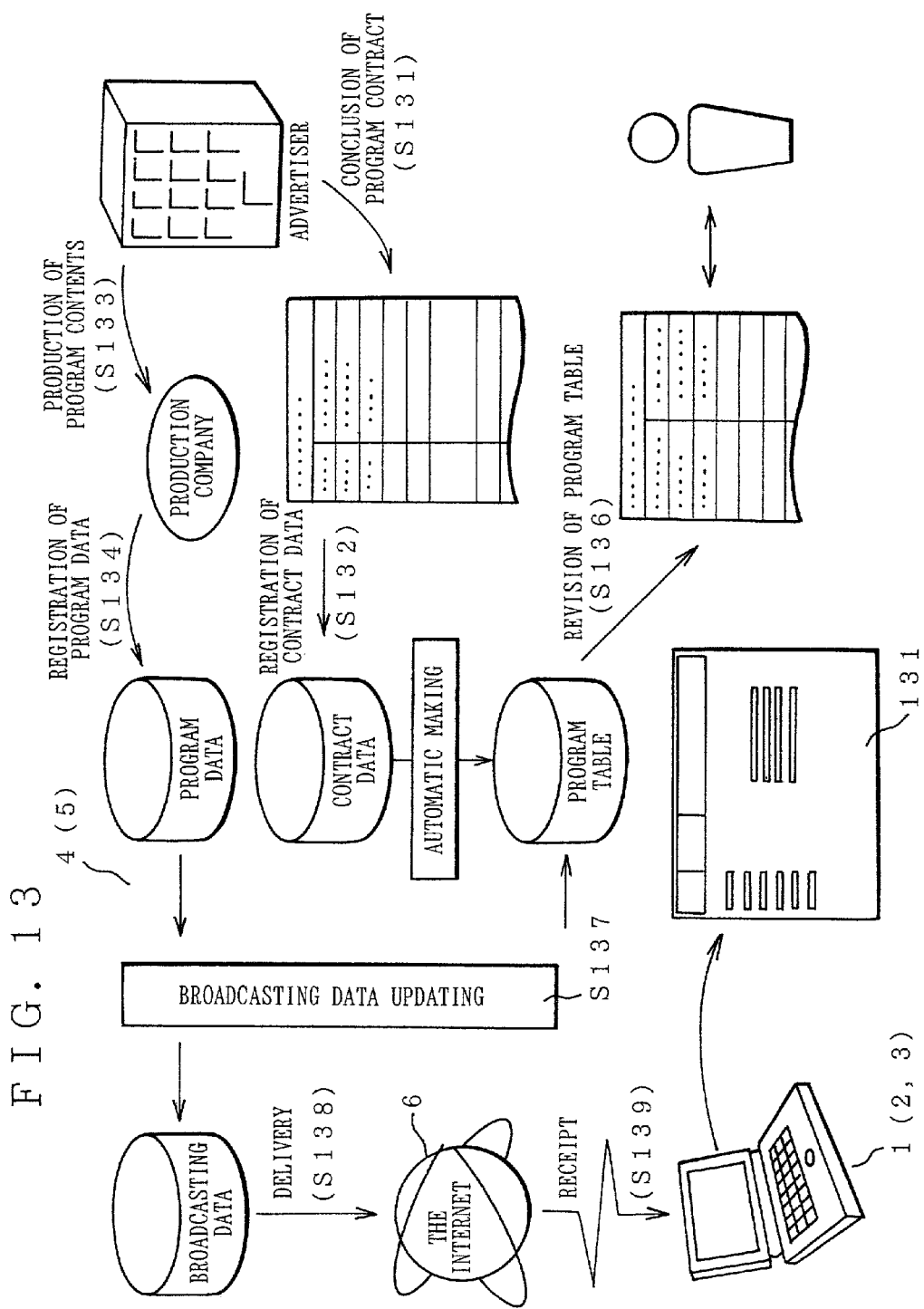
FIG. 13 is a schematic diagram showing the operation of the Internet broadcasting used in the network-type sales promotion system.

An outline of the Internet broadcasting system is shown in FIG. 13. The application program APL#0(426) shown in FIG. 5 is the software to realize this system. The Internet broadcasting system can provide various information during 24 hours by the multichannel. The Internet broadcasting system has mainly three functions; that is, a multi-purpose display, a media channel changeover function, and a scheduling function.

A program contract is concluded with an advertiser (Step S131), and the contract data is registered (Step S132). Production of the program contents is requested to a production company (Step S133), and the finished program data is registered to the DB (Step S134). Next, a program table is automatically made from the contract data (Step S135), and the program table is revised by the user after checking it (Step S136). And, through the broadcasting data updating (Step S137) and the Internet deliver (Step S138) and receiving (Step S139), the Internet broadcasting is closed.

The user can receive information of the Internet broadcasting by using the multi-purpose display screen. The screen consists of the above multi-media viewer 121 and the real-time viewer 122, each of the viewers 121,122 can display information of various format. By means of the channel changeover, information displayed no the multi-media viewer 121 can be changed by one button (123) arranged beside the monitor. The scheduling is delivered according to the program table. The progression is made according to the program table automatically made on the basis of the program contract DB.

Figure 14:
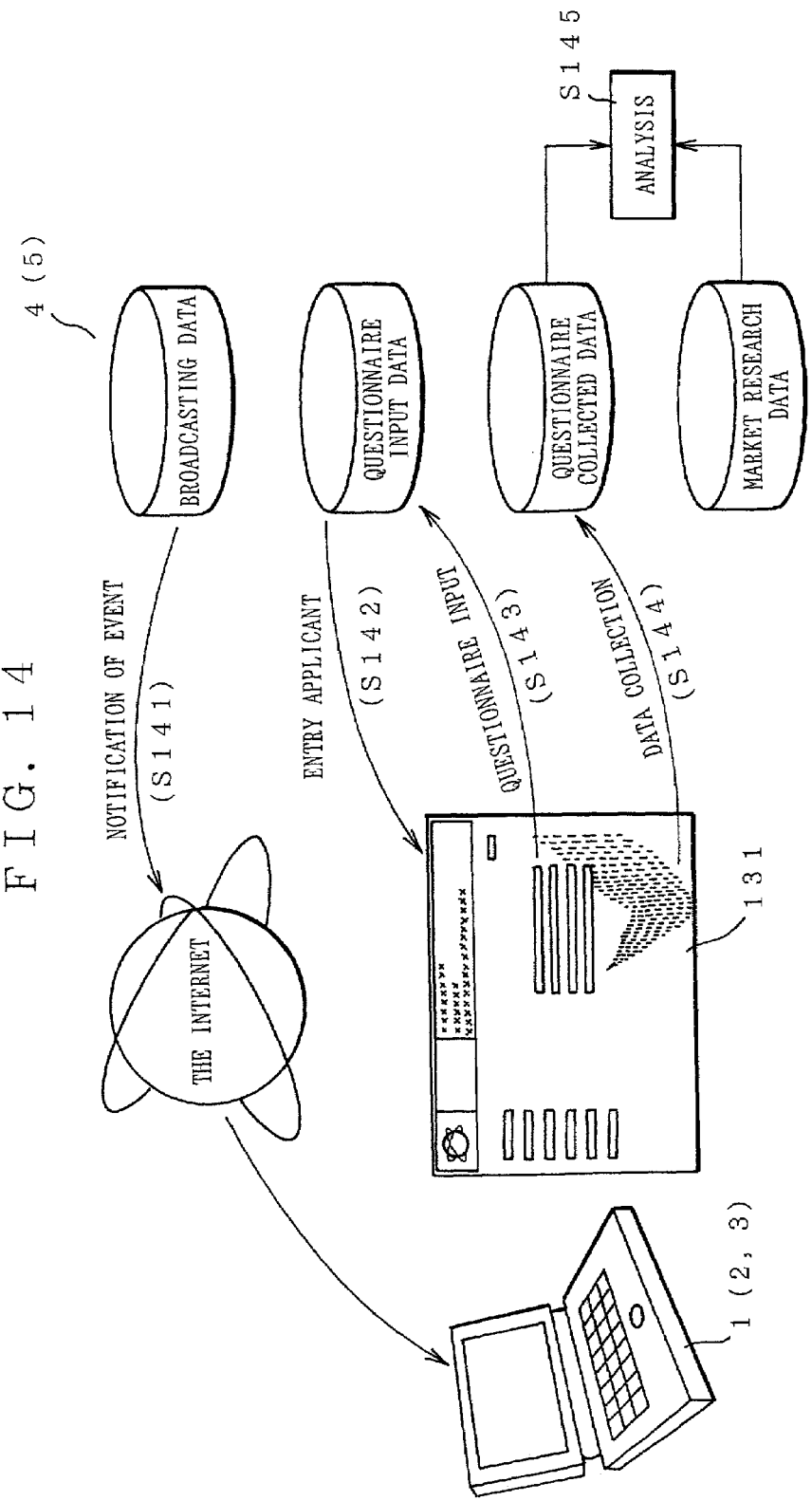
FIG. 14 is a schematic diagram showing the operation of the Internet market research used in the network-type sales promotion system.
Figure 15:
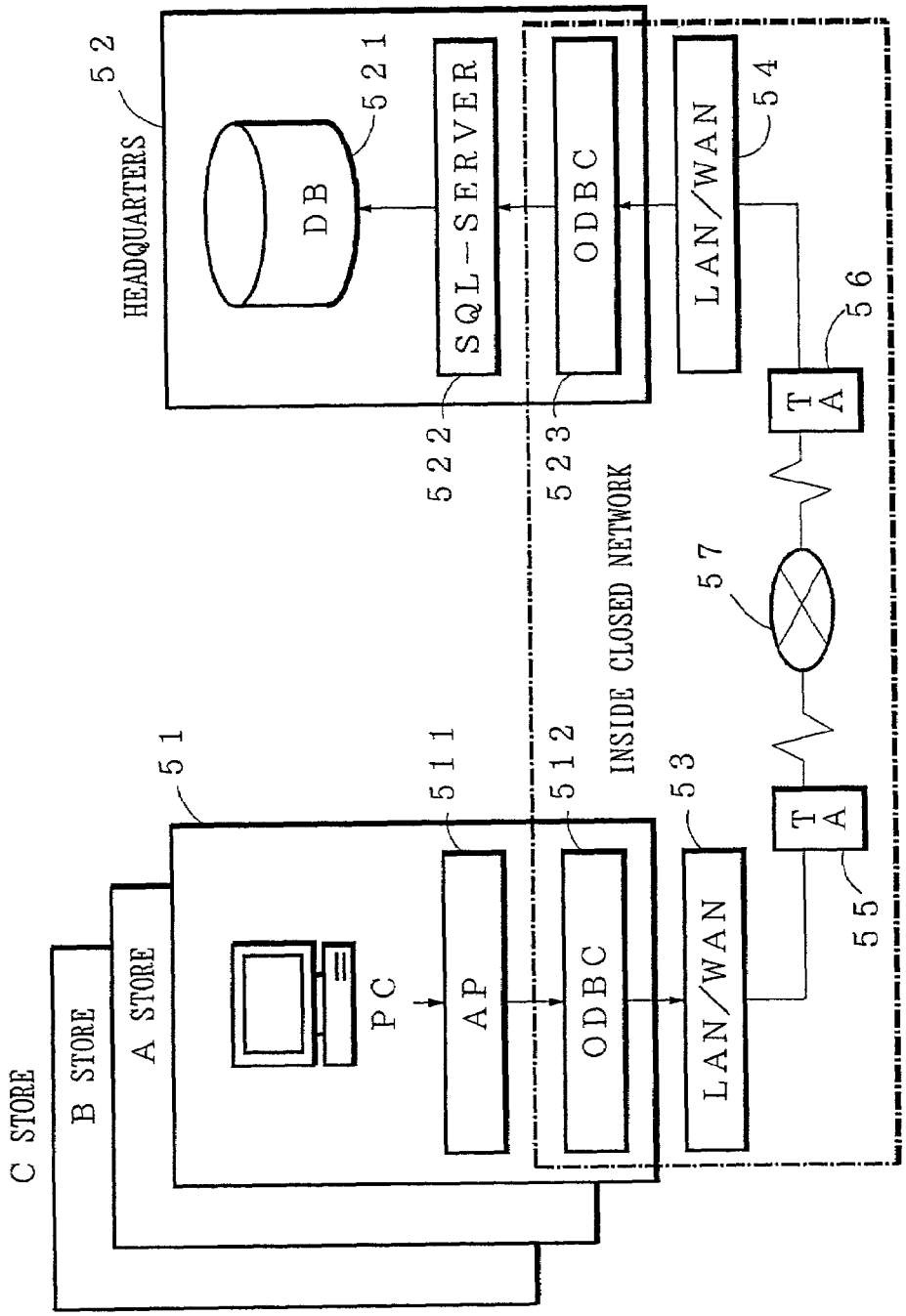
FIG. 15 is a block diagram showing an outline of the configuration of a POS system using a conventional client server system.

FIG. 14 shows an outline of the Internet market research system. The application program APL#1(427) shown in FIG. 5 is the software to realize this system.

The Internet market research is the one to analyze the user needs by making notice of information on the homepage and by receiving a user's response. Here, information is collected in a state that the notification of information and a questionnaire input form is integrated. And, in the notification of information, the latest news can be delivered by using the broadcasting. In the figure, by referring to the broadcasting data first, a notification of an event is executed to unspecified number of the general public by way of the Internet 6 (Step S141). The questionnaire input form is delivered to an entry applicant (Step S142), the user is pushed to fill up the questionnaire input form and to return it through the viewer (Step S143), the data is collected (Step S144), the data is analyzed (Step S145), and market research data is made out.

As above, the market research information is delivered by way of the Internet 6, and the reaction of the user looked at the information is historically managed. The market research information with the latest information will be delivered every moment according to the instruction of the server 4(5). When a user raises an access to the news, a questionnaire input form for the merchandise is displayed.

The news, in a news format, having scheduled according to a news program table stored in the DB of the server 4 can be delivered over 24 hours. And, timely information can be provided independently of the program table. The latest 35. information of, for example, an urgent news, stock prices information being updated successively, market research information, and information changing with the time such as weather forecast are provided.

The present invention is applicable, for example, to a navigation system on classes of school, not limited to the above sales management system. That is, the curriculum is automatically delivered periodically every day according to the schedule built in the DB by means of the Internet broadcasting function, whereby all the students can participate in the class simultaneously at home. And, an interactive access is realized by the Internet market research function, whereby question and answer between a student and a lecturer or between students is possible. Further, on the basis of the DB, questions from the students or the result of trial tests can be analyzed by utilizing various retrieval functions, improving points of class can be found, and problems which students are unaware of can, be found. Further, the student can repeatedly retrieve and invoke classes having delivered and receive them. By storing the result of the student in the DB, a historical and well-arranged results management can be attained, which enables more effective planning by analyzing the results.

A lot of application for, for example, a measure for improving drawing-custom power in franchise shops, the planning of sales strategy, and the navigation for the home trade can be found.

SUSCEPTIBILITY IN INDUSTRIAL
APPLICATION

As stated above, according to the inventive network-type data transmission method and system, a server or a terminal unit in the system, and a recording medium having recorded the method being programed, since the DB of the server can be operated from the client computer, the DB engine (the ODBC driver) is not necessary for the client, and a special protocol for connecting the DB engines is therefore not necessary, that is, only the TCP-IP communication driver generally used for the computer-communication connection is available.

And, though the Internet connection communication using the ISDN circuit or the Internet exclusive circuit is used, perfect communication security can be provided by carrying out the encryption. According to the present invention, the real-time and safe information transmission/receiving is attained with the command transmission protocol independent of the communications circuit. And, when the present invention is applied to the POS system, since every file is gathered on the DB server and the client computer is connected with the server by way of the Internet, the POS data can be transmit-received in real time by always referring to the new master. Therefore, trouble measures can be presented when the DB server is multiplexed. As a matter of course, for example the sales information, at the point of sales, of all the stores has been gathered on the DB server, a next merchandise sales strategy can be decided any time. That is, since the TCP-IP communication driver is implemented on the terminal unit, an environment capable of checking the current situation in real time can be provided by the connection with the Internet any time and anywhere.

Further, the inventive network-type data transmission method is applied to the sales promotion system. Specifically, the information transmission with low cost is executed by using the Internet broadcasting for an information notification, user needs is collected and analyzed in real time by the Internet market research linked to the Internet broadcasting, and an interactive banner in a virtual world is realized by using the recording medium for sales promotion effectively made on the basis of the result of the above, whereby the merchandise introduction easy to be understood is realized. And, a precise and effective sales promotion can be attained with the minimum cost. And, not limited to the sales promotion, the inventive network-type data transmission method is applicable to classes in school, a home lesson or the like. In this case, more effective navigation effect can be obtained by realizing the above Internet broadcasting function and Internet market research function.

The invention claimed is:

1. A sales management system using a network-type data transmission method, wherein a server and a plurality of terminal units sharing the server are connected by way of a network circuit, each terminal unit generates a packet command complying with a DB command transmission protocol independent of the network circuit each time the terminal unit collects data, and the server having received the packet command converts the packet command into a DB operation command, executes the DB operation command, and reflects an executed result on the DB, so that a demand from the terminal unit is responded in real time, wherein the terminal unit has a first viewer to display store-and-forward type data existing in a homepage or in a local memory medium and a second viewer to get real-time access to, and display, data successively updated and existing in the server, and the server has various sales data for merchandise master, sales, stock, sales amount, a DB wherein data for sales promotion including news programs is accumulated while linking to the sales data, a database server to execute merchandise inquiry and collection of sales information by executing retrieval, addition, updating of the sales data and sales promotion data, and a server body to inform of the sales data and sales promotion data to unspecified number of terminal units by using a homepage, to receive responses against the homepage, to reflect collected contents on the DB, and to inform the collected contents to the terminal units in real time.

2. The sales management system using the network-type data transmission method as set forth in claim 1, wherein marketing information is delivered to unspecified number of terminal units by way of the Internet, the server historically manages responses from the terminal units and analyzes user needs, data for sales promotion made on a basis of the analysis and distributed to the terminal units are recorded on a recording medium, and the data for sales promotion is regenerated through the first viewer.

3. A network-type data transmission system wherein a server and a plurality of terminal units sharing a server are connected by way of a public network circuit, said system comprising:

a) a terminal unit comprising a database-virtual private network (DB-VPN) driver for generating, each time each terminal unit brings about a demand for processing a database at the server, a private packet command for the transmission of a database (DB) operation command complying with a private DB command transmission protocol which is independent of the TCP-IP protocol for the public network circuit, said private packet command further including the packet command (A1a) allocated for each of respective proceedings for "DB opening," "DB readout," "DB storage," and "DB closing" along with a parameter necessary for each of the processings, said DB-VPN driver further comprising an encrypting means for carrying out an encryption processing to said private packet command generated; and b) a communication driver arranged between the DB-VPN driver and public network circuit to carry TCP-IP protocol for the public network circuit into execution, the server comprising a DB-VPN service for converting the received private packet command for the transmission of the DB operation command into a converted DB operation command, said DB-VPN service further comprising a decoding means for carrying out a decode processing to said received private packet command, open database connectivity (ODBC) driver as a database engine for invoking a database management system (DBMS) in response to said converted DB operation command, said DBMS executing the converted DB operation command to reflect an executed result on the DB of the server, and a communication driver arranged between the DB-VPN service and the public network circuit to carry the TCP-IP protocol for the public network circuit into execution, whereby, each time the terminal unit brings about a command for processing the database at the server, the server can respond to the demand substantially in real time.

4. A network-type data transmission system wherein a server and a plurality of terminal units sharing the server are connected by way of a network circuit, characterized in that
each time each terminal unit collects data, the terminal unit generates a packet command complying with a DB command transmission protocol independent of the network circuit,
the server having received the packet command converts the packet command into a DB operation command, executes the DB operation command, and reflect an executed result on the DB, so that a demand from the terminal unit can be responded in real time, and the terminal unit comprises
a packet generating means to generate the packet command complying with the DB command transmission protocol independent of the network circuit in use each time the terminal unit collects data and
a communication interface means to execute communication complying with a protocol necessary for exchanging the packet with the server, said package generating means further comprises
an encrypting means to carry out an encryption processing to the packet generated and
a decoding means to carry out a decode processing to the packet obtained from the server.

5. A network-type data transmission system wherein a server and a plurality of terminal units sharing the server are connected by way of a network circuit,
characterized in that
each time each terminal unit collects data, the terminal unit generates a packet command complying with a DB command transmission protocol independent of the network circuit,
the server having received the packet command, converts the packet into a DB operation command, executes the DB operation command, and reflect an executed result on the DB, so that a demand from the terminal unit can be responded in real time, and said server comprises
a packet converting means to convert the packet command, transmitted from the terminal unit, complying with the DB command transmission protocol independent of the network circuit into a DB operation command,
a database management system (DBMS) invoking means to be implemented with an interface independent of a DBMS in use and common to general DBMSs, to invoke the DBMS, and to instruct the DBMS to execute the DB operation command,
a DBMS to execute the DB operation command having obtained via the DBMS invoking means and to reflect an executed result on the DB, and
an interface means to execute communication complying with a protocol necessary for exchanging the packet with the terminal unit, said packet converting means comprises
a decoding means to carry out a decode processing to the packet received from the terminal unit and
an encrypting means to carry out an encryption processing to the packet to be transmitted to the terminal unit.

6. A server in a network-type data transmission system to which a plurality of terminal units each to generate, each time data is collected, a packet command complying with a DB command transmission protocol independent of a network circuit are connected by way of the network circuit, characterized in that
the server receives the packet command, converts the packet command into a DB operation command, executes the DB operation command, and reflect an executed result on the DB, so that a demand from the terminal unit can be responded in real time, said server comprises
a packet converting means to convert the packet command, transmitted from the terminal unit, complying with the DB command transmission protocol independent of the network circuit into a DB operation command,
a database management system (DBMS) invoking means to be implemented with an interface independent of a DBMS in use and common to general DBMSs, to invoke the DBMS, and to instruct the DBMS to execute the DB operation command,
a DBMS to execute the DB operation command having obtained via the DBMS invoking means and to reflect an executed result on the DB, and
an interface means to execute communication complying with a protocol necessary for exchanging the packet with the terminal unit, said packet converting means comprises
a decoding means to carry out a decode processing to the packet received from the terminal unit and
an encrypting means to carry out an encryption processing to the packet to be transmitted to the terminal unit.

7. A terminal unit in a network-type data transmission system, which terminal unit shares a DB server with other terminal units and is connected with the DB server by way of a network circuit, characterized in that
the terminal unit comprises
a means to issue a circuit connection demand to the DB server each time data is collected and to await a circuit connection approval from the server,
a means to get the circuit connection approval from the server and to issue a DB opening demand,
a means to get a DB opening processing response by the server and to issue a DB retrieval demand,
a means to get a DB retrieval processing response by the server and to issue a DB updating demand,
a means to get a DB updating processing response by the server and to issue a DB closing demand,
a means to get a DB closing processing response by the server, to issue a DB circuit disconnection demand, and to await a circuit disconnection approval from the server, and
a means to get the circuit disconnection approval by the server and to close a processing for collecting data, said terminal unit further comprises
in the issuance of the DB opening demand,
a means to issue the connection demand to a server corresponding an address and to await a connection response from the server,
a means to get the response from the server, to make a random seed, and to encrypt, and transmit, the random seed,
a means to issue an authentication demand to the server and to await an authentication by the server,
a means to get an authentication response from the server and to decode, and take in, an authentication result,
a means to generate a DB opening command, to which at least an object name, address, and ID are set as initial parameters, when the authentication is successful, to encrypt, and transmit, the DB opening command to the server, and to await a response from the server,
a means to get an opening response from the server and to decoded, and take in, a response result, and a retrying means to admit a failure of the authentication and a failure of the DB connection by a predetermined number of times and to retry the authentication process and the DB connection process by the predetermined number of times.

8. A computer-readable recording medium having recorded a server program used for a server in a network-type data transmission system wherein a server and a plurality of terminal units sharing the server are connected by way of a network circuit, characterized in that the server program comprises (a) a step to receive a circuit connection demand from the terminal unit and to transmit a connection approval, b) a step to receive a DB Opening demand from the terminal unit and to issue a DB operation command for a DB opening processing to a database management system (DBMS), (c) a step to receive a DB opening processing result by the DBMS and to respond to the terminal unit having made the demand, (d) a step to receive a DB retrieval demand from the terminal unit and to issue a DB operation command for a DB readout to the DBMS, (e) a step to get a DB retrieval processing response by the DBMS and to respond to the terminal unit having made the demand, (f) a step to receive a DB updating demand from the terminal unit and to issue a DB operation command for a DB updating processing to the DBMS, (g) a step to get a DB updating processing response by the DBMS and to respond to the terminal unit having made the demand, (h) a step to receive a DB closing demand from the terminal unit and to issue a DB operation command for a DB closing processing to the DBMS, (i) a step to get a DB closing processing response from the DBMS and to respond to the terminal unit having made the demand, and (j) a step to receive a circuit disconnection demand from the terminal unit and to transmit a circuit disconnection approval to the terminal unit having made the demand, and each time data is collected by the terminal unit, the server program executes the steps (a)-(j) so as to process the data, said step (b) to receive, the DB opening demand from the terminal unit and to issue the DB operation command for the DB opening processing to the DBMS further comprises a step to receive a circuit connection demand from the terminal unit and to await a server circuit connection, a step to generated a client task utter the server circuit connection and to respond to the terminal unit having made the demand, a step to receive an authentication demand from the terminal unit, to await a server authentication, to decode a random seed obtained, and to encrypt a result of the authentication so as to respond to the terminal unit having made the demand, a step to receive a DB opening command from the terminal unit, to decode the DB opening command, and to issue a DB operation command for entrusting a DB opening processing to the DBMS, and a step to encrypt a DB opening processing result and to respond to the terminal unit having made the demand, said step (d) to receive a DB retrieval demand from the terminal unit and to issue a DB operation command for a DB readout to the DBMS further comprises a step to execute a command list prepared for a retrieval with respect to the opened DB on a basis of input data from the terminal unit, and a step to successively read in record data until required data is found and to take in contents of the required data when the required data is found, by executing the command list, said step (f) to receive a DB updating demand from the terminal unit and to issue a DB operation command for a DB updating processing to the DBMS, further comprises a step to store data on a work memory, and a step to finally write in the DB so as to reflect the serial DB work.

9. A network-type data transmission system wherein a server and a plurality of terminal units sharing the server are connected by way of a public network circuit, said system comprising:

a) a database-virtual private network (D-VPN) driver for generating, each time each terminal unit brings about a demand for processing a database at the server, a private packet command for the transmission of a database (DB) operation command complying with a private DB command transmission protocol which is independent of a transport control protocol-internet protocol (TCP-IP) protocol for the public network circuit;

b) a communication driver arranged between the DB-VPN driver and public network circuit to carry TCP-IP protocol for the public network circuit into execution, c) the server comprising:

i) a DB-VPN service for converting the received private packet command for the transmission of the DB operation command into a converted DB operation command;

ii) an open database connectivity (ODBC) driver for compatibly accepting said converted DB operation command with a common interface independent of a variety of interfaces of Database Management System (DBMS)s to invoke a DBMS as a database engine in response to said converted DB operation command, said DBMS executing said converted DB operation command to reflect an executed result on the database (DB) of the server; and iii) a communication driver arranged between the DB-VPN service and the public network circuit to carry the TCP-IP protocol for the public network circuit into execution, whereby, each time the terminal unit brings about a command for processing the database at the server, the server can respond to the demand substantially in real time.

10. The network-type data transmission system as set forth in claim 9, wherein when the packet complying with the private DB command transmission protocol independent of the network circuit is generated by the terminal unit, an encryption processing is carried out on the packet at the terminal unit, the packet is transmitted to the server, and the packet is decoded at the server.

11. The network-type data transmission system as set forth in claim 9, wherein when the server responds to the terminal unit, an encryption processing is carried out on the packet at the server, the packet is transmitted to the terminal unit, and the packet is decoded at the terminal unit.

12. The network-type data transmission system as set forth in claim 9, wherein said packet command for the transmission of a DB operation command complying with a private DB command transmission protocol which is independent of the TCP-IP protocol for the public network circuit includes the packet command prepared along with a parameter necessary for each processing for DB Opening, DB Readout, DB Storage and DB Closing.

13. A network-type data transmission system wherein a server and a plurality of terminal units sharing the server are connected by way of a public network circuit, said system comprising:
   a) the terminal unit comprising a DB-VPN (database virtual private network) driver for generating, each time each terminal unit brings about a demand for processing a database at the server, a packet command for the transmission of a DB operation command complying with a private database (DB) command transmission protocol which is independent of the TCP-IP protocol for the public network circuit, said packet command further including:
      i) the packet command allocated for each respective processing for DB Opening, DB Readout, DB Storage and DB Closing, along with a parameter necessary for each of said processing, said DB-VPN driver further comprising an encryption means for carrying out an encryption processing to said pocket command generated; and
      ii) a communication driver arranged between the DB-VPN driver and the public network circuit to carry the TCP-IP protocol for the public network circuit into execution, and
   b) the server comprising:
      i) a DB-VPN service for converting the receive packet command for the transmission of the DB operation command into a converted DB operation command, said DB-VPN service further comprising a decoding means for carrying out a decode processing to said received private packet command;
      ii) and ODBC (open database connectivity) driver for compatibly accepting said converted DB operation command with a common interface independent of a variety of interfaces of DBMSs to invoke a DBMS as a database engine in response to said converted DB operation command, said DBMS executing said converted DB operation DB operation command to reflect an executed result on the database of the server and
      iii) a communication driver arranged between the DB-VPN service and the public network circuit to carry the TCP-IP protocol for the public network circuit into execution,
   whereby each time the terminal unit brings about a demand for processing the database at the server, the server can respond to the demand substantially in real time.

14. A network-type data transmission system wherein a server and a plurality of terminal units sharing the server are connected by way of a public network circuit, said system comprising:
   a) The server comprising a DB-VPN service for converting the received private packet command for the transmission of the DB operation command into a converted DB operation command,
   b) An ODBC (open database connectivity) driver for compatibly accepting said converted DB operation command with a common interface independent of a variety of interfaces of DBMSs to invoke a DBMS as a database engine in response to said converted DB operation command, said DBMS executing said converted DB operation command to reflect an executed result on the database of the server and
   c) a communication driver arranged between the DB-VPN service and the public network circuit to carry the TCP-IP protocol for the public network circuit into execution,
   whereby each time the terminal unit brings about a demand for the database at the server, the server can respond to the demand substantially in real time.

15. A network-type transmission system wherein a server and a plurality of terminal units sharing the server are connected by way of a network circuit, wherein
   each time each of the terminal units collects data, the terminal unit generates a packet command complying with a DB command transmission protocol independent of the network circuit;
   the server having received the packet command converts the packet command into a DB operation command, executes the DB operation command, and reflects an executed result on the DB, so that a demand from the terminal unit an be responded to in real time; and
   the terminal unit comprises:
   a packet generating means to generate the packet command complying with the DB command transmission protocol independent of the network circuit in use each time the terminal unit collects data; and
   a communication interface means to execute communication complying with a protocol necessary for exchanging the packet with the server, said packet generating means further comprises:
      an encrypting means to carry out an encryption processing to the packet generated and
      a decoding means to carry out a decoded processing to the packet obtained from the server.

16. A network-type data transmission system wherein a server and a plurality of terminal units sharing the server are connected by way of a network circuit, characterized in that
   each time each terminal unit collects data, the terminal unit generates a packet command complying with a DB command transmission protocol independent of the network circuit,
   the server having received the packet command, converts the packet into a DB operation command, executes the DB operation command, and reflect an executed result on the DB, so that a demand from the terminal unit can be responded in real time, and said server comprises
   a packet converting means to convert the packet command, transmitted from the terminal unit, complying with the DB command transmission protocol independent of the network circuit into a DB operation command,
   a DBMS invoking means to be implemented with an interface independent of a database management system (DBMS) in use and common to general DBMSs, to invoke the DBMS, and to instruct the DBMS to execute the DB operation command,
   a DBMS to execute the DB operation command having obtained via the DBMS invoking means and to reflect an executed result on the DB, and
   an interface means to execute communication complying with a protocol necessary for exchanging the packet with the terminal unit, said packet converting means comprises
   a decoding means to carry out a decode processing to the packet received from the terminal unit and
   an encrypting means to carry out an encryption processing to the packet to be transmitted to the terminal unit.

17. A server in a network-type data transmission system to which a plurality of terminal units each to generate, each time data is collected, a packet command complying with a DB command transmission protocol independent of a network circuit are connected by way of the network circuit, characterized in that the server receives the packet command, converts the packet command into a DB operation command, executes the DB operation command, and reflect an executed result on the DB, so that a demand from the terminal unit can be responded in real time, said server comprises a packet converting means to convert the packet command, transmitted from the terminal unit, complying with the DB command transmission protocol independent of the network circuit into a DB operation command, a DBMS invoking means to be implemented with an interface independent of a database management system (DBMS) in use and command to general DBMSs, to invoke the DBMS, and to instruct the DBMS to executed the DB operation command, a DBMS to execute the DB operation command having obtained via the DBMS invoking means and to reflect an executed result on the DB, and an interface means to execute communication complying with a protocol necessary for exchanging the packet with the terminal unit, said packet converting means comprises a decoding means to carry out a decode processing to the packet received from the terminal unit and an encrypting means to carry out an encryption processing to the packet to be transmitted to the terminal unit.

18. A terminal unit in a network-type data transmission system, which terminal unit shares a DB server with other terminal units and is connected with the DB server by way of a network circuit, characterized in that the terminal unit comprises a means to issue a circuit connection demand to the DB server each time data is collected and to await a circuit connection approval from the server, a means to get the circuit connection approval from the server and to issue a DB opening demand, a means to get a DB opening processing response by the server and to issue a DB retrieval demand, a means to get a DB retrieval processing response by the server and to issue a DB up-dating demand, a means to get a DB updating processing response by the server and to issue a DB closing demand, a means to get a DB closing processing response by the server, to issue a DB circuit disconnection demand, and to await a circuit disconnection approval from the server, and a means to get the circuit disconnection approval by the server and to close a processing for collecting data, said terminal unit further comprises in the issuance of the DB opening demand, a means to issue the connection demand to a server corresponding an address and to await a connection response from the server, a means to get the response from the server, to make a random seed, and to encrypt, and transmit, the random seed, a means to issue an authentication demand to the server and to await an authentication by the server, a means to get an authentication response from the server and to decode, and take in, an authentication result, a means to generate a DB opening command, to which at least an object name, address, and ID are set as initial parameters, when the authentication is successful, to encrypt, and transmit, the DB opening command to the server, and to await a response from the server, a means to get an opening response from the server and to decoded, and take in, a response result, and a retrying means to admit a failure of the authentication and a failure of the DB connection by a predetermined number of times and to retry the authentication process and the DB connection process by the predetermined number of times.

19. The terminal unit in the network-type data transmission system as set forth in claim 18, wherein the terminal unit further comprises a means to issues a circuit connection demand to another multiplexed DB server when the terminal unit issues the circuit connection demand to the server and does not receive any response for a predetermined period of time.

20. A computer-readable recording medium having recorded a server program used for a server in a network-type data transmission system wherein a server and a plurality of terminal units sharing the server are connected by way of a network circuit, characterized in that the server program comprises (a) a step to receive a circuit connection demand from the terminal unit and to transmit a connection approval, (b) a step to receive a DB opening demand from the terminal unit and to issue a DB operation command for a DB opening processing to a DBMS, (c) a step to receive a DB opening processing result by the DBMS and to Respond to the terminal unit having made the demand, (d) a step to receive a DB retrieval demand from the terminal unit and to issue a DB operation command for a DB readout to the DBMS, (e) a step to get a DB retrieval processing response by the DBMS and to respond to the terminal unit having made the demand, (f) a step to receive a DB updating demand from the terminal unit and to issue a DB operation command for a DB updating processing to the DBMS, (g) a step to get a DB updating processing response by the DBMS and to respond to the terminal unit having made the demand, (h) a step to receive a DB closing demand from the terminal unit and to issue a DB operation command for a DB closing processing to the DBMS, (i) a step to get a DB closing processing response from the DBMS and to respond to the terminal unit having made the demand, and (j) a step to receive a circuit disconnection demand from the terminal unit and to transmit a circuit disconnection approval to the terminal unit having made the demand, and each time data is collected by the terminal unit, the server program executes the steps (a)-(j) so as to process the data, said step (b) to receive the DB opening demand from the terminal unit and to issue the DB operation command for the DB opening processing to the DBMS further comprises a step to receive a circuit connection demand from the terminal unit and to await a server circuit connection, a step to generate a client task after the server circuit connection and to respond to the terminal unit having made the demand, a step to receive an authentication demand from the terminal unit, to await a server authentication, to decode a random seed obtained, and to encrypt a result of the authentication so as to respond to the terminal unit having made the demand, a step to receive a DB opening command from the terminal unit, to decode the DB opening command, and to issue a DB operation command for entrusting a DB opening processing to the DBMS, and a step to encrypt a DB opening processing result and to respond to the terminal unit having made the demand, said step (d) to receive a DB retrieval demand from the terminal unit and to issue a DB operation command for a DB readout to the DBMS further comprises a step to execute a command list prepared for a retrieval with respect to the opened DB on a basis of input data from the terminal unit, and a step to successively read in record data until required data is found and to take a contents of the required data when the required data is found, by executing the command list, said step (f) to receive a DB updating demand from the terminal unit and to issue a DB operation command for a DB updating processing to the DBMS further comprises a step to store data on a work memory, and a step to finally write in the DB so as to reflect the serial DB work.

* * * * *